(12) United States Patent
Lee

(10) Patent No.: US 10,846,804 B2
(45) Date of Patent: Nov. 24, 2020

(54) ELECTRONIC BUSINESS CARD EXCHANGE SYSTEM AND METHOD USING MOBILE TERMINAL

(71) Applicant: Jun-Yub Lee, Seoul (KR)

(72) Inventor: Jun-Yub Lee, Seoul (KR)

( * ) Notice: Subject to any disclaimer, the term of this patent is extended or adjusted under 35 U.S.C. 154(b) by 0 days.

(21) Appl. No.: 16/737,744

(22) Filed: Jan. 8, 2020

(65) Prior Publication Data

US 2020/0226695 A1    Jul. 16, 2020

(30) Foreign Application Priority Data

Jan. 14, 2019 (KR) .................. 10-2019-0004550
Jan. 15, 2019 (KR) .................. 10-2019-0005195
Jul. 19, 2019 (KR) .................. 10-2019-0087299

(51) Int. Cl.
*H04M 3/42*      (2006.01)
*G06Q 50/00*    (2012.01)
*G06Q 10/06*    (2012.01)
*G06Q 10/10*    (2012.01)

(52) U.S. Cl.
CPC ....... *G06Q 50/01* (2013.01); *G06Q 10/06311* (2013.01); *G06Q 10/1095* (2013.01)

(58) Field of Classification Search
CPC ............. G06Q 50/01; G06Q 10/06311; G06Q 10/1095
See application file for complete search history.

(56) References Cited

U.S. PATENT DOCUMENTS

| | | | | |
|---|---|---|---|---|
| 8,244,037 B2* | 8/2012 | Huang | .................... | G06F 16/93 382/181 |
| 10,333,356 B2* | 6/2019 | Ding | .................... | B60L 53/126 |
| 2003/0069746 A1* | 4/2003 | Kuramatsu | ............ | G06Q 10/10 709/205 |
| 2006/0075050 A1* | 4/2006 | Kanatani | ............ | G06Q 20/3821 709/206 |
| 2007/0158403 A1* | 7/2007 | Ertas | ...................... | G06Q 10/10 235/375 |
| 2008/0082557 A1* | 4/2008 | Ohara | .................... | G06Q 10/00 |
| 2008/0125148 A1* | 5/2008 | Zhao | .................... | H04M 1/2757 455/466 |
| 2011/0276602 A1* | 11/2011 | Terada | .................... | G06Q 10/10 707/784 |
| 2012/0290601 A1* | 11/2012 | Huang | ............... | G06K 9/00469 707/769 |

(Continued)

*Primary Examiner* — Amancio Gonzalez
(74) *Attorney, Agent, or Firm* — Studebaker & Brackett PC

(57) ABSTRACT

The present invention relates to an electronic business card exchange system and method using a mobile terminal. Particularly, the present invention relates to an electronic business card exchange system using a mobile terminal and an electronic business card exchange method using a mobile terminal, wherein an electronic business card is generated and is registered in a server, business card identification information of the registered electronic business card is assigned by the server, the business card identification information is used to transmit the business card to a mobile terminal of at least one business card exchange target nearby, and the business card exchange targets receiving the electronic business cards are grouped according to any one or more among a position, a time, and a keyword, such as a meeting name, or the like, for management.

20 Claims, 21 Drawing Sheets

(56) References Cited

U.S. PATENT DOCUMENTS

| | | | | |
|---|---|---|---|---|
| 2013/0126619 A1* | 5/2013 | Del Fiume | ............ | H04L 9/3247 235/492 |
| 2014/0075329 A1* | 3/2014 | Kim | ...................... | G06Q 30/02 715/748 |
| 2014/0365395 A1* | 12/2014 | Arguelles | ............... | G06Q 10/10 705/342 |
| 2015/0382181 A1* | 12/2015 | Chen | .................... | H04W 8/183 455/418 |

* cited by examiner

ELECTRONIC BUSINESS CARD EXCHANGE SYSTEM AND METHOD USING MOBILE TERMINAL

CROSS REFERENCE TO RELATED APPLICATION

The present application claims priority to Korean Patent Application No. 10-2019-0004550, filed Jan. 14, 2019, Korean Patent Application No. 10-2019-0005195, filed Jan. 15, 2019, and Korean Patent Application No. 10-2019-0087299, filed Jul. 19, 2019, the entire contents of which are incorporated herein for all purposes by this reference.

BACKGROUND OF THE INVENTION

Field of the Invention

The present invention relates to an electronic business card exchange system and method using a mobile terminal. Particularly, the present invention relates to an electronic business card exchange system using a mobile terminal and an electronic business card exchange method using a mobile terminal, wherein an electronic business card is generated and is registered in a server, business card identification information of the registered electronic business card is assigned by the server, the business card identification information is used to transmit the business card to a mobile terminal of at least one business card exchange target nearby, and the business card exchange targets receiving the electronic business cards are grouped according to any one or more among a place, a time, and a keyword, such as a meeting name, or the like, for management.

Further, the present invention includes a function of matching per individual or per group with respect to duplicated electronic business cards for respective groups which are results of the grouping by any one or more among the place, the time and the keyword, such as the meeting name, or the like, so that by using information (image or texture) related to the duplicated electronic business cards for the respective groups, additional matching takes place per individual or per group or personal information which may be matched is managed.

Description of the Related Art

In general, if people who are working members of society have conferences or meetings, they exchange their business cards to introduce themselves. Therefore, most people may have several tens to hundreds of real business cards. These several tens to hundreds of real business cards are stored in a business card holder, or a business card case. However, as the number of real business cards increases, it is difficult to find or distinguish the business cards. Further, although business card users carry their business cards in business card holders or business card cases, there is a problem that a person frequently fails to give the business cards to all the people attending the meeting due to lack of the business cards if replenishment is not timely. Further, since the business cards are mode of resources such as paper, plastic, etc., there is a problem that the user has to pay for the material when the business cards are manufactured.

For these reasons, in recent years, various electronic business card exchange systems have been developed and applied in which an electronic business card is created through a particular application of a mobile terminal, such as a smartphone, a smartpad, or the like, operating on the basis of an application and the created electronic business card is provided to other people through wired or wireless communication.

In general, the conventional electronic business card exchange system is configured to transmit and receive the relatively large size of an image-based electronic business card. Even though the transmission rate becomes faster, significant traffic occurs. Therefore, when multiple users simultaneously transmit and receive business cards, the transmission and reception time of the electronic business cards is delayed.

Also, the conventional electronic business card exchange system simply stores the received electronic business cards in a memory but does not provide a tool for managing the same. Thus, when the user wants to find a particular electronic business card, the user has to look at all the electronic business card images one by one, which takes a long time.

Also, if the user did not make a special note of why the user attended the meeting where the electronic business card is received and of whom the user met, after a particular time, it is difficult to identify who gave the electronic business card and why the user met the person.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an electronic business card exchange system and method using a mobile terminal, wherein an electronic business card is generated as an image and the result is registered in a server, business card identification information of the registered electronic business card image is assigned by the server, the business card identification information is used to transmit the business card to a mobile terminal of at least one business card exchange target nearby, and the business card exchange targets receiving the electronic business cards are grouped according to any one or more a place location, a time, and a keyword, such as a meeting name, or the like, for management.

Further, the present invention includes a function of matching per individual or per group with respect to duplicated electronic business cards for respective groups which are results of the grouping by any one or more among the place, the time and the keyword, such as the meeting name, or the like, so that by using information (image or texture) related to the duplicated electronic business cards for the respective groups, additional matching takes place per individual or per group or personal information which may be matched is managed.

In order to achieve the above objectives, according to one aspect of the present invention, there is provided an electronic business card exchange system using a mobile terminal, the system including: the mobile terminal configured to generate and store an image-based electronic business card and then transmit business card registration request information including the electronic business card and user identification information, receive electronic business card identification information corresponding to the electronic business card and map the electronic business card identification information to the electronic business card for storage, receive, in an electronic business card provision mode when the electronic business cards are exchanged, selection of at least one business card exchange target and transmit business card provision request information including business card exchange target information of the selected business card exchange target and the electronic business card identification information, and receive, in an electronic business card reception mode, an image-based electronic business card; and a business card exchange server configured to receive the business card registration request information and map and store the electronic business card and the user identification information included therein, generate the electronic business card identification information corresponding to the electronic business card to map the electronic business card identification information to either the electronic business card or the user identification information for storage, and then provide the electronic business card identification information to the mobile terminal, receive the business card provision request information from the mobile terminal operating in the electronic business card provision mode and providing the electronic business card, and transmit the image-based electronic business card corresponding to the business card identification information to the mobile terminal receiving the electronic business card and corresponding to the user identification information, which is included in the business card provision request information, of the at least one business card exchange target.

In order to achieve the above objectives, according to another aspect of the present invention, there is provided an electronic business card exchange method using a mobile terminal, the method including: an electronic business card registration process in which an electronic business card and user identification information are mapped and stored, and electronic business card identification information is transmitted to the mobile terminal that transmits business card registration request information; a business card provision request process in which when the electronic business cards are exchanged, the mobile terminal operating in an electronic business card provision mode and providing the electronic business card receives selection of at least one business card exchange target and transmits business card provision request information to a business card exchange server; an electronic business card provision process in which the business card exchange server transmits the electronic business card identification information corresponding to an electronic business card image to the mobile terminal receiving the electronic business card, the mobile terminal belonging to the business card exchange target indicated by business card exchange target information included in the business card provision request information; and an electronic business card reception process in which the mobile terminal operating in an electronic business card reception mode and receiving the electronic business card receives the electronic business card that the business card exchange server transmits.

According to the present invention, when the electronic business card is transmitted to the mobile terminal of the business card exchange target, the mobile terminal of the business card provider does not transmit the image-based electronic business card, but transmits only the electronic business card identification information corresponding to the user's electronic business card so as to provide the electronic business card to the business card exchange target, thereby minimizing the amount of traffic occurring when transmitting the electronic business card.

Also, the present invention provides a means for grouping and managing, when the electronic business cards are received from at least two business card exchange targets, the business card exchange targets receiving the electronic business cards. Therefore, it is easy to recognize which meeting where any of the grouped electronic business cards is received at.

Also, according to the present invention, after the electronic business cards are exchanged with at least two business card exchange targets, even though the electronic business cards that the user receives are not grouped, the business card exchange targets who exchanged the electronic business cards are automatically grouped according to a location (region), a time, or the like measured through the mobile terminal, thereby providing convenience to the user.

Also, according to the present invention, when the electronic business card is transmitted and received, the mobile terminal recognizes the user's gesture and transmits or receives the business card, thereby providing the effect as if the real business cards were exchanged.

Also, according to the present invention, as the electronic business card is transmitted and received, display effect and sound effect are provided, thereby providing the effect to the electronic business card provider or receiver as if the real business cards were exchanged.

Also, the present invention includes a function of matching per individual or per group with respect to duplicated electronic business cards for respective groups which are results of the grouping by any one or more among the place, the time and the keyword, such as the meeting name, or the like, so that by using information (image or texture) related to the duplicated electronic business cards for the respective groups, additional matching takes place per individual or per group or personal information which may be matched is managed.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinafter, a configuration and an operation of an electronic business card exchange system using a mobile terminal according to the present invention and an electronic business card exchange method of the system will be described with reference to the accompanying drawings.

Figure 1:
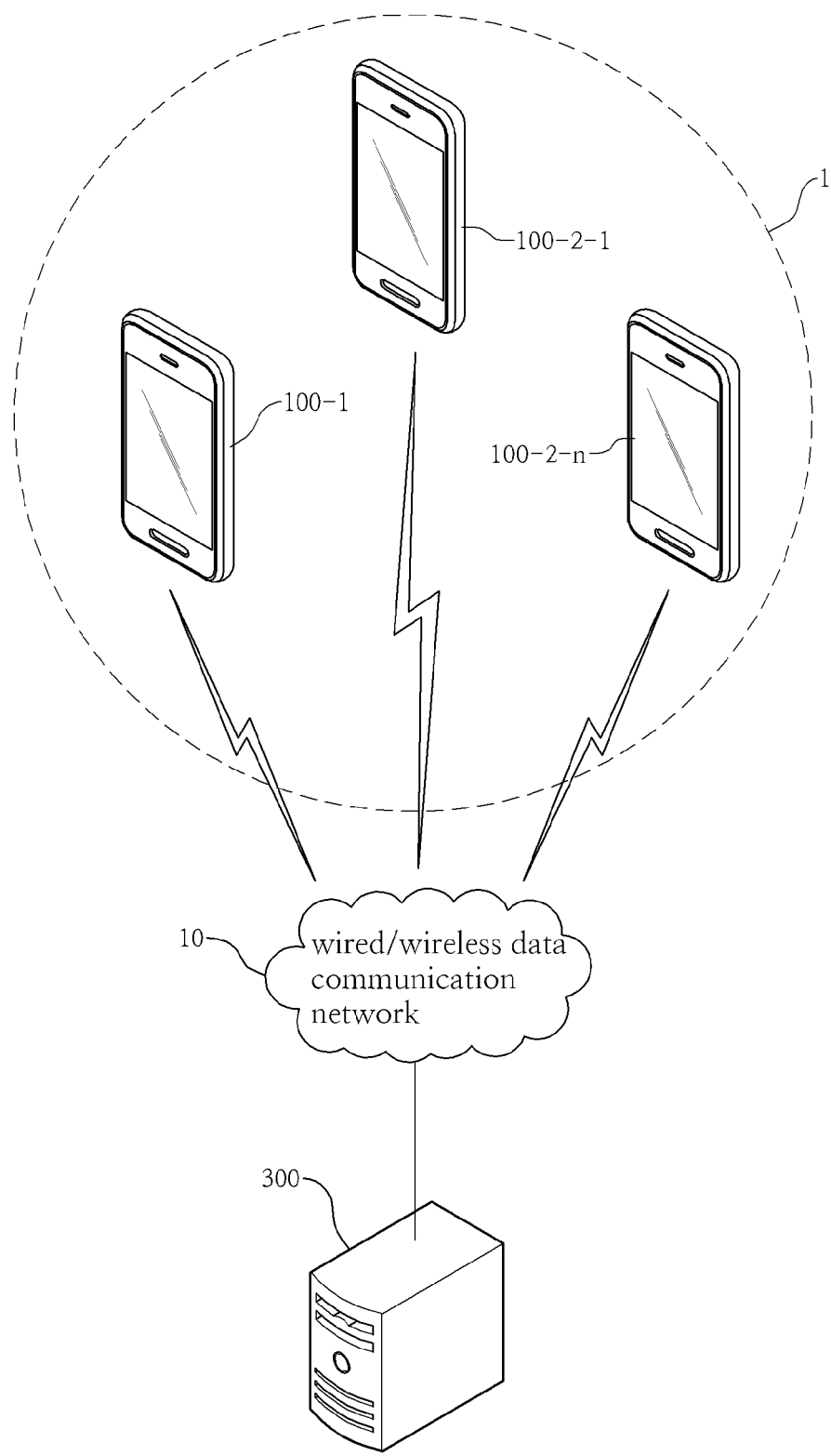
FIG. 1 is a diagram illustrating a configuration of an electronic business card exchange system using a mobile terminal according to the present invention.

FIG. 1 is a diagram illustrating a configuration of an electronic business card exchange system using a mobile terminal according to the present invention.

Referring to FIG. 1, the electronic business card exchange system using the mobile terminal according to the present invention includes a mobile terminal 100-1 providing an electronic business card, at least one mobile terminal 100-2 receiving an electronic business card, and a business card exchange server 300.

The mobile terminal 100-1 providing an electronic business card, the mobile terminal 100-2 receiving an electronic business card, and the business card exchange server 300 are connected to a wired/wireless data communication network 10 either in a wired manner or in a wireless manner to perform data communication with each other.

The mobile terminal 100-1 providing an electronic business card and the mobile terminal 100-2 receiving an electronic business card are the same mobile terminals 100, and the mobile terminals are classified according to whether the terminals operate in an electronic business card provision mode or in an electronic business card reception mode in an electronic business card exchange application installed according to the present invention. Therefore, the configurations and the operations of the mobile terminal 100-1 providing an electronic business card and the mobile terminal 100-2 receiving an electronic business card are not separately described below. The operations of one mobile terminal 100 depending on the electronic business card provision mode and on the electronic business card reception mode will be separately described.

The wired/wireless data communication network 10 may be a communication network in which one or more of the following networks are combined: Internet networks including a Wi-Fi network consisting of access points (APs), mobile communication networks including mobile communication base stations such as 3G (the third generation), 4G, 5G, Wibro networks, and the like.

The mobile terminal 100 is a terminal, such as a smartphone, a smartpad, or the like, which is capable of being connected to the wired/wireless data communication network 10, and is a user terminal operating on the basis of an application.

The mobile terminal 100 acquires a business card image of a business card to be registered, transmits business card registration request information including an electronic business card including the acquired business card image, and user identification information to the business card exchange server 300, and receives, in response thereto, business card identification information from the business card exchange server 300 and stores the same to register the electronic business card. The user identification information may be terminal identification information of the mobile terminal 100, may be user information such as the user's name, nickname, ID, or the like, or may include both the terminal identification information and the user information. The terminal identification information may be a telephone number of the mobile terminal. The business card identification information may be information including numbers and letters. The electronic business card may include only the above-described business card image, or may include the business card image and brief information. The brief information may be a part of the content of the business card image, such as a name, a telephone number, an email address, or the like, or may be information set separately by the user.

Further, the mobile terminal 100 receives selection of at least one business card exchange target by a user in the electronic business card provision mode, transmits business card provision request information including business card exchange target information of the selected business card exchange target and the electronic business card identification information, and receives and stores an image-based electronic business card in the electronic business card reception mode.

A detailed configuration and operation of the mobile terminal 100 will be described in detail with reference to FIG. 2 below.

The business card exchange server 300 receives the business card registration request information from the mobile terminal 100 to map and store the electronic business card and the user identification information included therein, generates the electronic business card identification information corresponding to the electronic business card to map the generated electronic business card identification information to either the electronic business card or the user identification information for storage, and provides the electronic business card identification information to the mobile terminal, whereby the electronic business card is registered.

Further, when the business card exchange server 300 receives the business card provision request information from the mobile terminal 100 operating in the electronic business card provision mode, the business card exchange server 300 transmits the image-based electronic business card corresponding to the business card identification information to the mobile terminal 100 operating in the electronic business card reception mode wherein the mobile terminal 100 corresponds to the user identification information, which is included in the business card provision request information, of the at least one business card exchange target.

Figure 2:
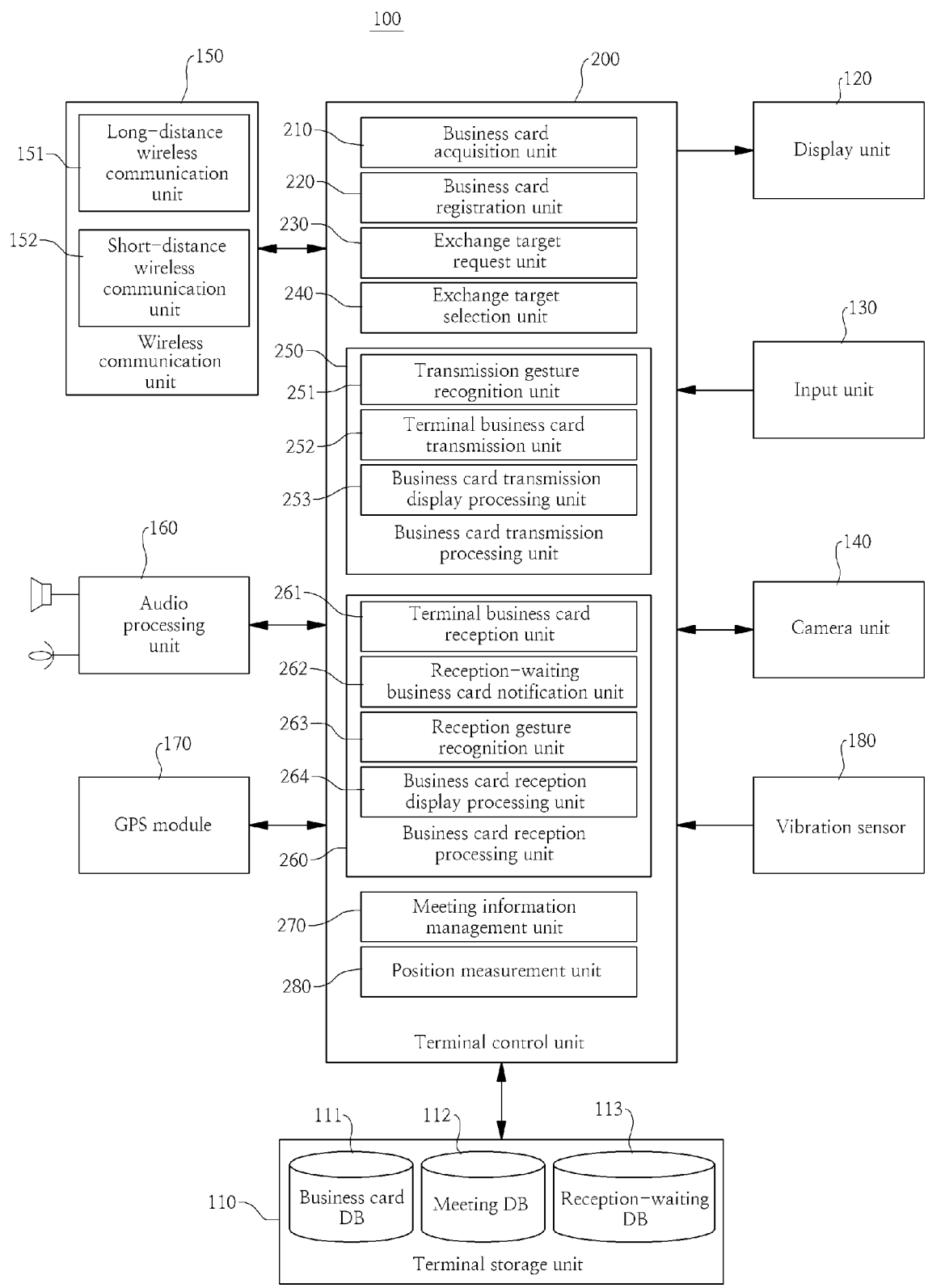
FIG. 2 is a diagram illustrating a detailed configuration of a mobile terminal for an electronic business card exchange system using the mobile terminal according to the present invention.

FIG. 2 is a diagram illustrating a detailed configuration of a mobile terminal for an electronic business card exchange system using the mobile terminal according to the present invention.

Referring to FIG. 2, the mobile terminal 100 includes a terminal storage unit 110, a display unit 120, an input unit 130, a camera unit 140, a wireless communication unit 150, an audio processing unit 160, a GPS module 170, and a vibration sensor 180.

The terminal storage unit 110 includes a program area storing a control program for controlling the overall operation of the mobile terminal 100 according to the present invention, a temporary area temporarily storing data generated during the execution of the control program, and a data area semi-permanently storing data generated during the execution of the control program or required for the execution.

The data area may consist of a business card DB 111, a meeting DB 112, a reception-waiting DB 113, and the like.

The business card DB 111 stores electronic business card information of the electronic business card of the user and electronic business card information of the electronic business cards received from other users. The electronic business card information may include the electronic business card including the business card image and the brief information, grouping information, the business card identification information, and the like, for the electronic business card that is input by the user or automatically input. The grouping information may include any one or more among a keyword including a meeting name, and the like, position and time information in which the business card is provided.

The meeting DB 112 stores group information in which grouping takes place according to a relationship between the received electronic business cards. For example, when electronic business cards are received from three people at a meeting in Myeongdong, Seoul, the electronic business cards of the three people are managed as one group called the Seoul Myeongdong meeting.

The reception-waiting DB 113 is a database that temporarily stores an electronic business card received in the electronic business card reception mode.

The display unit 120 is a display device, such as a liquid-crystal display (LCD), or the like, and displays various types of information into any one or more among text, graphics, still images, videos, and the like.

The input unit 130 includes multiple buttons for performing function setting, and includes any one or more among a button input device outputting a button signal for the pressed button to a terminal control unit 200, a key input device having multiple keys for inputting multiple functions and letters and outputting a key signal for the pressed key, a touchpad provided integrally with the screen of the display unit 120 and outputting a position signal on the screen being touched to the terminal control unit 200, and the like. As a result, the input unit 130 provides a user interface means by which the user is capable of inputting various types of information and commands.

The camera unit 140 includes a camera having a lens, obtains an image formed by the lens, and outputs either a still image or a video to the terminal control unit 200.

The wireless communication unit 150 includes a long-distance wireless communication unit 151 and a short-distance wireless communication unit 152. The long-distance wireless communication unit 151 is connected to the mobile communication network of the wired/wireless data communication network 10 in a wireless manner so that data communication with another device connected to the wired/wireless data communication network 10 is performed. The short-distance wireless communication unit 152 is connected to Wi-Fi in a wireless manner so that data communication with another device connected to the wired/wireless data communication network 10 is performed.

The audio processing unit 160 includes a speaker and a microphone. The audio processing unit 160 converts audio data input from the terminal control unit 200 into an audio signal and then generates audible sound corresponding to the audio signal through the speaker. The audio processing unit 160 converts ambient sound, which is audible sound, into an audio signal through the microphone, and converts the audio signal into audio data for output to the terminal control unit 200.

The GPS module 170 receives, among multiple global positioning system (GPS) satellites, unique position data of each of arbitrary GPS satellites and outputs the position data to the terminal control unit 200.

As the vibration sensor 180, a three-axis gyro acceleration sensor may be applied. The vibration sensor 180 detects vibration caused by shaking of the mobile terminal 100 and outputs vibration direction and intensity information resulting from the vibration to the terminal control unit 200.

The terminal control unit 200 includes a business card acquisition unit 210, a business card registration unit 220, an exchange target request unit 230, an exchange target selection unit 240, a business card transmission processing unit 250, and a business card reception processing unit 260. According to an embodiment, the terminal control unit 200 further includes a meeting information management unit 270 and a position measurement unit 280. The terminal control unit 200 controls the overall operation of the mobile terminal 100 according to the present invention.

Specifically, the business card acquisition unit 210 acquires an electronic business card including the business card image that is acquired by scanning the real business card. The business card image may be acquired by being received from another device through the wireless communication unit 150, or may be acquired through the camera unit 140.

The business card registration unit 220 acquires the electronic business card and the user identification information to transmit the business card registration request information including the image-based electronic business card and the user identification information to the business card exchange server 300 through the wireless communication unit 150. The business card registration unit 220 receives the business card identification information in response to the business card registration request information, and maps the business card identification information to the electronic business card in the business card DB 111 for storage and registration. The user identification information may be information that is acquired through the input unit 130 or stored in advance.

The exchange target request unit 230 operates in the electronic business card provision mode and transmits business card exchange target list request information to the business card exchange server 300. In response to this, the exchange target request unit 230 receives, from the business card exchange server 300, a business card exchange target list including the user identification information of at least one business card exchange target and displays the business card exchange target list on the display unit.

The exchange target request unit 230 may transmit the business card exchange target list request information including position information of the user calculated through the position measurement unit 280. Thus, the exchange target request unit 230 may be configured to receive, from the business card exchange server 300, the business card exchange target list including only business card exchange targets who are positioned within a predetermined distance from the position indicated by the position information.

The position measurement unit 280 calculates the current position of the mobile terminal 100 by applying any one or more among satellite-based position information in which the position is tracked using position data of at least three GPS satellites input from the GPS module 170, and network-based position information in which the position is calculated using a reception signal or information included in the reception signal received from the base station or AP through the wireless communication unit 150.

The exchange target selection unit 240 receives the selection, by the user through the input unit 130, of at least one of the business card exchange targets in the business card exchange target list displayed on the display unit 120, and stores business card exchange target information, which is information of the selected business card exchange target.

The business card transmission processing unit 250 transmits, when at least one business card exchange target is selected through the exchange target selection unit 240, the business card provision request information including the business card exchange target information of the selected business card exchange target and the electronic business card identification information to the business card exchange server 300.

According to an embodiment, the business card transmission processing unit 250 may include a transmission gesture recognition unit 251, a terminal business card transmission unit 252, and a business card transmission display processing unit 253.

Specifically, the transmission gesture recognition unit 251 monitors, when the business card exchange target is selected, whether a gesture by the user who is an electronic business card provider is detected, and outputs, when the gesture is detected, a transmission command.

The gesture by the user may be a gesture that the electronic business card to be provided is touched and is dragged in the direction of business card exchange target identification information corresponding to the business card exchange target that is selected by the user through the touchpad of the input unit 130 and is displayed on the display unit 120, or may be a gesture that the user shakes the mobile terminal 100. The business card exchange target identification information may be a business card thumbnail image of the business card exchange target. In the former case, the transmission gesture recognition unit 251 recognizes the gesture by position signals continuously input through the touchpad of the input unit 130. In the latter case, the transmission gesture recognition unit 251 recognizes the gesture by a vibration signal input through the vibration sensor 180.

When the transmission command is received from the transmission gesture recognition unit 251, the terminal business card transmission unit 252 transmits the business card provision request information including the business card identification information of the at least one electronic business card to the business card exchange server 300, or transmits the business card provision request information including the business card identification information of only one electronic business card to the business card exchange server 300.

When selecting the exchange target to which the electronic business card is transmitted, the business card transmission display processing unit 253 performs a display control in such a manner that the thumbnail, which is the exchange target identification information of the selected exchange target, or an action of shaking the business card image is displayed, in order to inform the user that transmission is ready. When transmitting the business card provision request information, the business card transmission display processing unit 253 performs a display control in such a manner that a transmission action is displayed on the display unit 120, specifically, the business card image displayed on the display unit gradually disappears while moving forward.

The business card transmission display processing unit 253 may perform a control in such a manner that business card transmission audio data is output to the audio processing unit 160 and a sound effect of the business card flying away in the air is output through the audio processing unit 160.

The business card reception processing unit 260 receives, in the electronic business card reception mode, the image-based electronic business card from the business card exchange server 300 and stores the received image-based electronic business card in the business card DB 111.

According to an embodiment, the business card reception processing unit 260 may include a terminal business card reception unit 261, a reception-waiting business card notification unit 262, a reception gesture recognition unit 263, and a business card reception display processing unit 264.

The terminal business card reception unit 261 receives the electronic business card from the business card exchange server 300 and stores the received electronic business card in the reception-waiting DB 113. The received electronic business card may be stored in the temporary area rather than in the reception-waiting DB 113. However, in this case, when the power is turned off, the electronic business card in the temporary area is deleted.

The reception-waiting business card notification unit 262 notifies or informs, when the electronic business card is stored in the reception-waiting DB 113, the user that the received electronic business card is present, through the display unit 120 so that the user recognizes this.

The reception gesture recognition unit 263 determines, when the electronic business card waiting to be received is present, whether a reception gesture by the user for reception processing of the electronic business card waiting to be received is detected. When the reception gesture is detected, the electronic business card stored in the reception-waiting DB 113 is stored in the business card DB 111 for reception processing and the electronic business card stored in the reception-waiting DB 113 is deleted. The reception gesture may be click on an electronic business card reception button through the input unit 130, selection of a reception menu, shaking in the same manner as the transmission gesture, or the like.

The business card reception display processing unit 264 performs, when the electronic business card reception gesture is detected, a reception effect display control in such a manner the entire electronic business card is displayed as being moved little by little from the beginning of the electronic business card.

The meeting information management unit 270 acquires, when the electronic business card is received, the grouping information for the received electronic business card to map the grouping information to the electronic business card for storage. The meeting information management unit 270 generates, on the basis of the grouping information, a group of the electronic business cards having a relationship and stores the group in the meeting DB 112. The meeting information management unit 270 provides the group information on the group when any electronic business card among the electronic business cards in the group is selected. The grouping information may be geographic information based on position, or may be a meeting name, date, time, and the like. To this end, the meeting information management unit 270 may display a grouping GUI on the display unit 120 so that the grouping information is input and edited.

Further, the meeting information management unit 270 includes a function of matching per individual or per group with respect to the duplicated electronic business cards for respective groups which are results of the grouping by the grouping information so that by using information (image or texture) related to the duplicated electronic business cards for the respective groups, additional matching takes place per individual or per group or personal information which may be matched is managed.

According to an embodiment, the meeting information management unit 270 may transmit the generated group information to the business card exchange server 300 for management.

The position measurement unit 280 tracks the position of the current mobile terminal 100 by performing satellite-based position tracking, in which position tracking is performed using position data of at least three GPS satellites periodically input from the GPS module 170, and by performing network-based position tracking through the wireless communication unit 150. The information on the tracked position is provided to the requiring configuration such as the exchange target request unit 230, or the like, and is provided to the business card exchange server 300 through the wireless communication unit 150.

Figure 3:
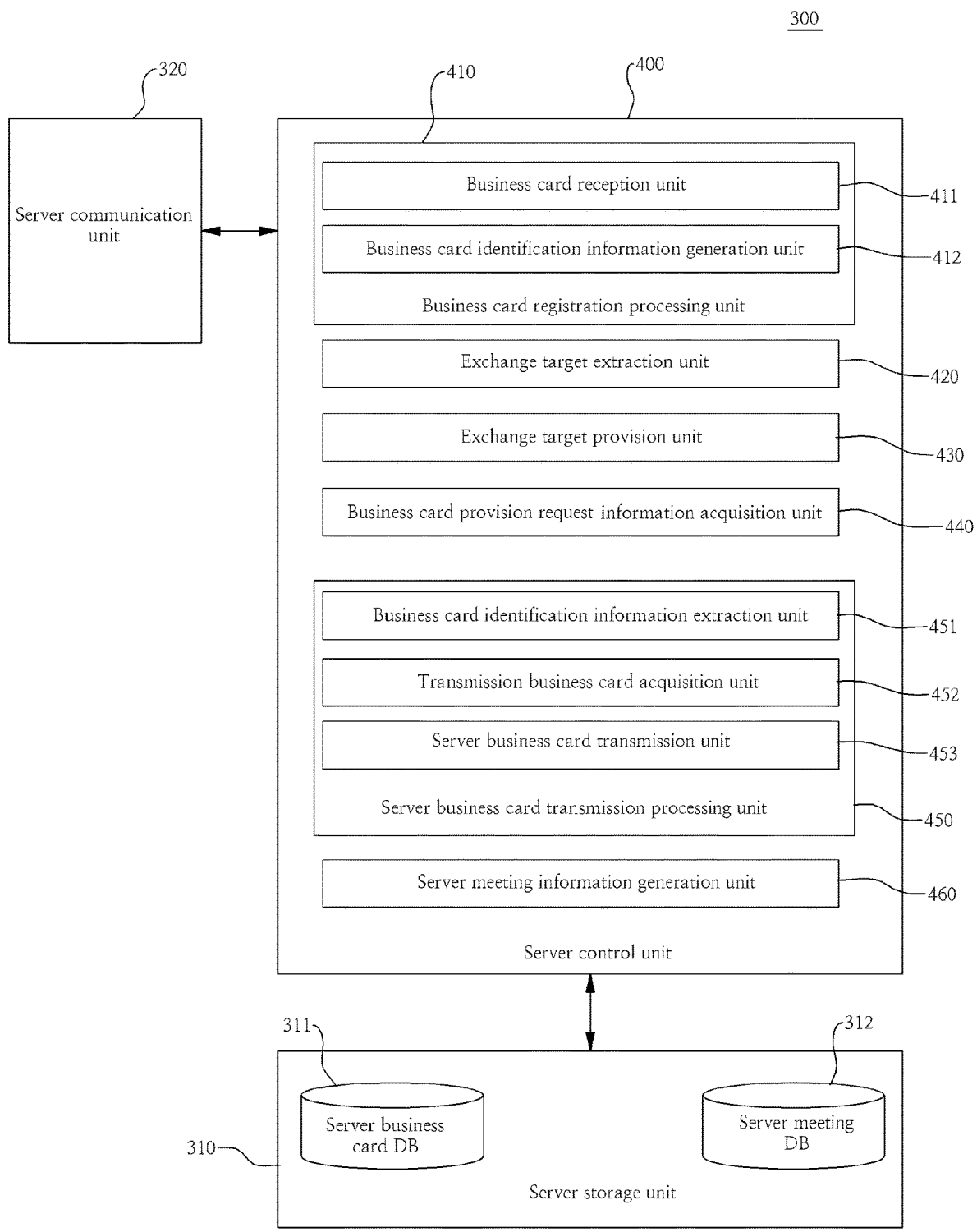
FIG. 3 is a diagram illustrating a detailed configuration of a business card management server of an electronic business card exchange system using a mobile terminal according to the present invention.

FIG. 3 is a diagram illustrating a detailed configuration of a business card management server of an electronic business card exchange system using a mobile terminal according to the present invention.

The business card management server 300 includes a server storage unit 310, a server communication unit 320, and a server control unit 400.

The server storage unit 310 includes a program area storing a control program for controlling the overall operation of the business card management server 300, a temporary area temporarily storing data generated during the execution of the control program, and a data area semi-permanently storing data generated during the execution of the control program and data required for the execution of the control program. The data area may consist of a server business card DB 311, and according to an embodiment, may consist of a server meeting DB 312.

The server business card DB 311 stores at least one electronic business card registered per user and business card identification information corresponding to the electronic business card.

The server meeting DB 312 stores and manages a received electronic business card per user and group information for the received electronic business card.

The server communication unit 320 is connected to the wired/wireless data communication network 10 to perform data communication with the mobile terminals 100.

The server control unit 400 includes a business card registration processing unit 410, an exchange target extraction unit 420, an exchange target provision unit 430, a business card provision request information acquisition unit 440, and a server business card transmission processing unit 450. According to an embodiment, the server control unit 400 further includes a server meeting information generation unit 460. The server control unit 400 controls the overall operation of the business card exchange server 300 according to the present invention.

The business card registration processing unit 410 includes a business card reception unit 411 and a business card identification information generation unit 412. The business card reception unit 411 receives the business card registration request information from the mobile terminal 100 and extracts, from the received business card registration request information, the user identification information and the image-based electronic business card to store the same in the server business card DB 311. The business card identification information generation unit 412 generates the business card identification information corresponding to the stored electronic business card and maps the business card identification information to the electronic business card for storage.

The exchange target extraction unit 420 outputs, when business card exchange target request information is received from the mobile terminal 100 in the electronic business card provision mode, the business card exchange target list in which all the users registered in the server business card DB 311 according to the embodiment are business card exchange targets.

Further, the exchange target extraction unit 420 may search, when the business card exchange target request information includes position information, the server business card DB 311 for business card exchange targets within a predetermined distance from the position indicated by the position information, and may output the business card exchange target list of the found business card exchange targets. To this end, the exchange target extraction unit 420 receives the position information from the mobile terminal 100 of the user registered in the server business card DB 311 through the server communication unit 320 and stores the position information in the server business card DB 311. The position information needs to be updated periodically.

Further, when the business card exchange target request information includes a search word, such as a meeting name, a region name, a nick name, or the like, the exchange target extraction unit 420 extracts only the user having the electronic business card and the user identification information that include information corresponding to the search word, to generate and output a business card exchange target list.

The exchange target provision unit 430 may transmit the business card exchange target list output from the exchange target extraction unit 420 to the mobile terminal 100 through the server communication unit 320.

The business card provision request information acquisition unit 440 monitors whether the business card provision request information including the business card exchange target information of the business card exchange target selected by the user of the mobile terminal 100 and the electronic business card identification information is received. When the business card provision request information is received, the same is output to the server business card transmission processing unit 450.

The server business card transmission processing unit 450 includes a business card identification information extraction unit 451, a transmission business card acquisition unit 452, and a server business card transmission unit 453. The business card identification information extraction unit 451 extracts the business card identification information from the business card provision request information output from the business card provision request information acquisition unit 440 and outputs the extracted business card identification information. The transmission business card acquisition unit 452 searches the server business card DB 311 for the electronic business card corresponding to the extracted business card identification information and loads the found electronic business card. The server business card transmission unit 453 transmits the loaded electronic business card to the mobile terminal 100 of the business card exchange target indicated by the business card exchange target information. The electronic business card includes, as described above, the business card image, the brief information, which is text information, for the business card image, and the like. The brief information may include any one or more among a name, a company name, a telephone number, an address, a nickname, and the like that the user of the electronic business card sets.

The server meeting information generation unit 460 receives, from the mobile terminal 100 through the server communication unit 320, the electronic business card and the group information that the mobile terminal 100 receives, and stores the electronic business card and the group information in the server meeting DB 312. When group information request information including the business card identification information of the received electronic business card is received from the mobile terminal 100, the server meeting information generation unit 460 provides electronic business cards belonging to the group indicated by the group information to the mobile terminal 100.

Figure 4:
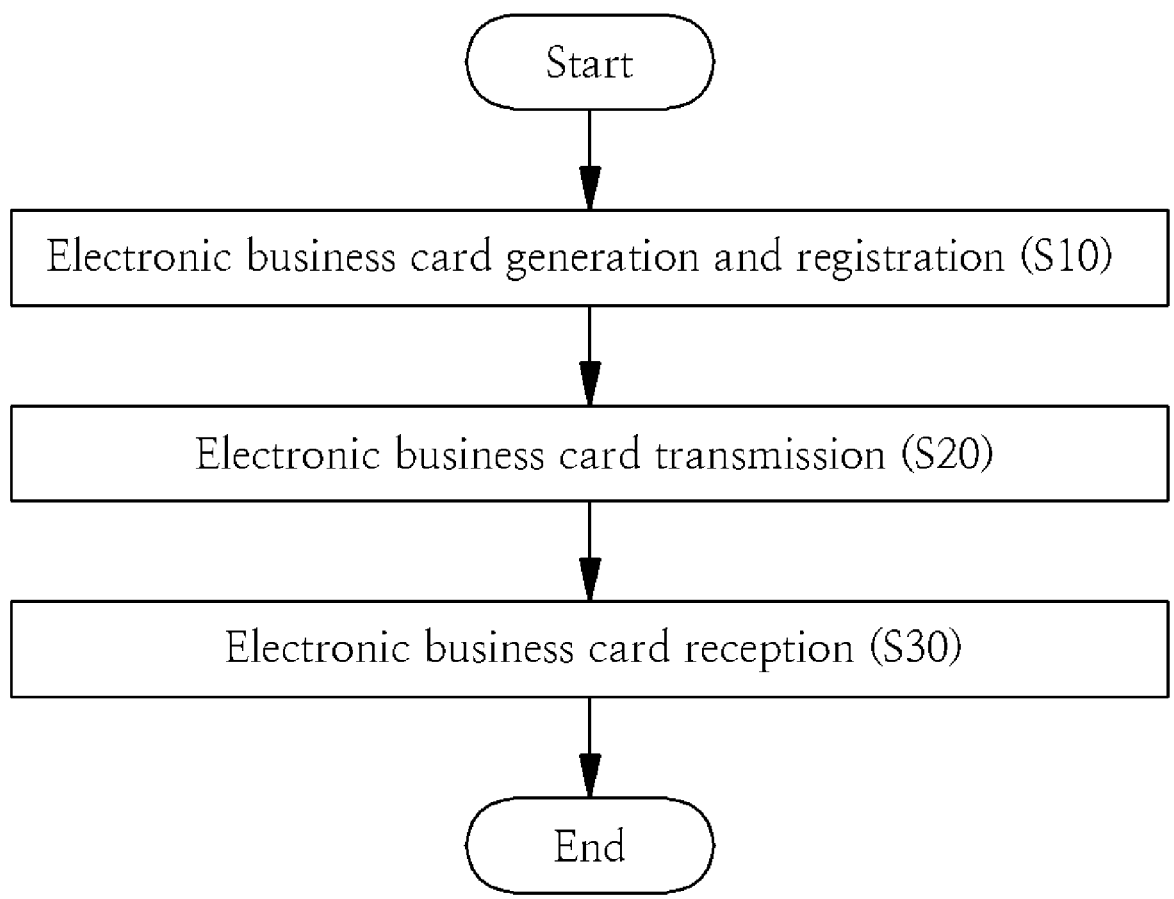
FIG. 4 is a flowchart illustrating an electronic business card exchange method using a mobile terminal according to the present invention.

FIG. 4 is a flowchart illustrating an electronic business card exchange method using a mobile terminal according to the present invention.

Referring to FIG. 4, the electronic business card exchange method according to the present invention includes an electronic business card generation and registration process at step S10, an electronic business card transmission process at step S20, and an electronic business card reception process at step S30.

First, the electronic business card generation and registration process at step S10 is performed with the following actions. The mobile terminal 100 generates the electronic business card and transmits the electronic business card to the business card exchange server 300. The business card exchange server 300 generates the business card identification information corresponding to the received electronic business card and maps the business card identification information to the received electronic business card for registration. Then, the business card exchange server 300 provides the business card identification information to the mobile terminal 100. The electronic business card generation and registration process at step S10 will be described in detail with reference to FIG. 5.

The electronic business card transmission process at step S20 is performed with the following actions. The business card provision request information including the user identification information of the business card exchange target to whom the electronic business card is desired to be provided and the business card identification information is transmitted to the business card exchange server 300. The business card exchange server 300 transmits the image-based electronic business card corresponding to the business card identification information in the business card provision request information, to the mobile terminal 100 corresponding to the user identification information in the business card provision request information. The electronic business card transmission process at step S20 will be described in detail with reference to FIG. 6.

The electronic business card reception process at step S30 is performed with the following action. The electronic business card transmitted by the business card exchange server 300 is received and stored by the mobile terminal 100 of the business card exchange target. The electronic business card reception process at step S30 will be described in detail with reference to FIG. 9.

Figure 5:
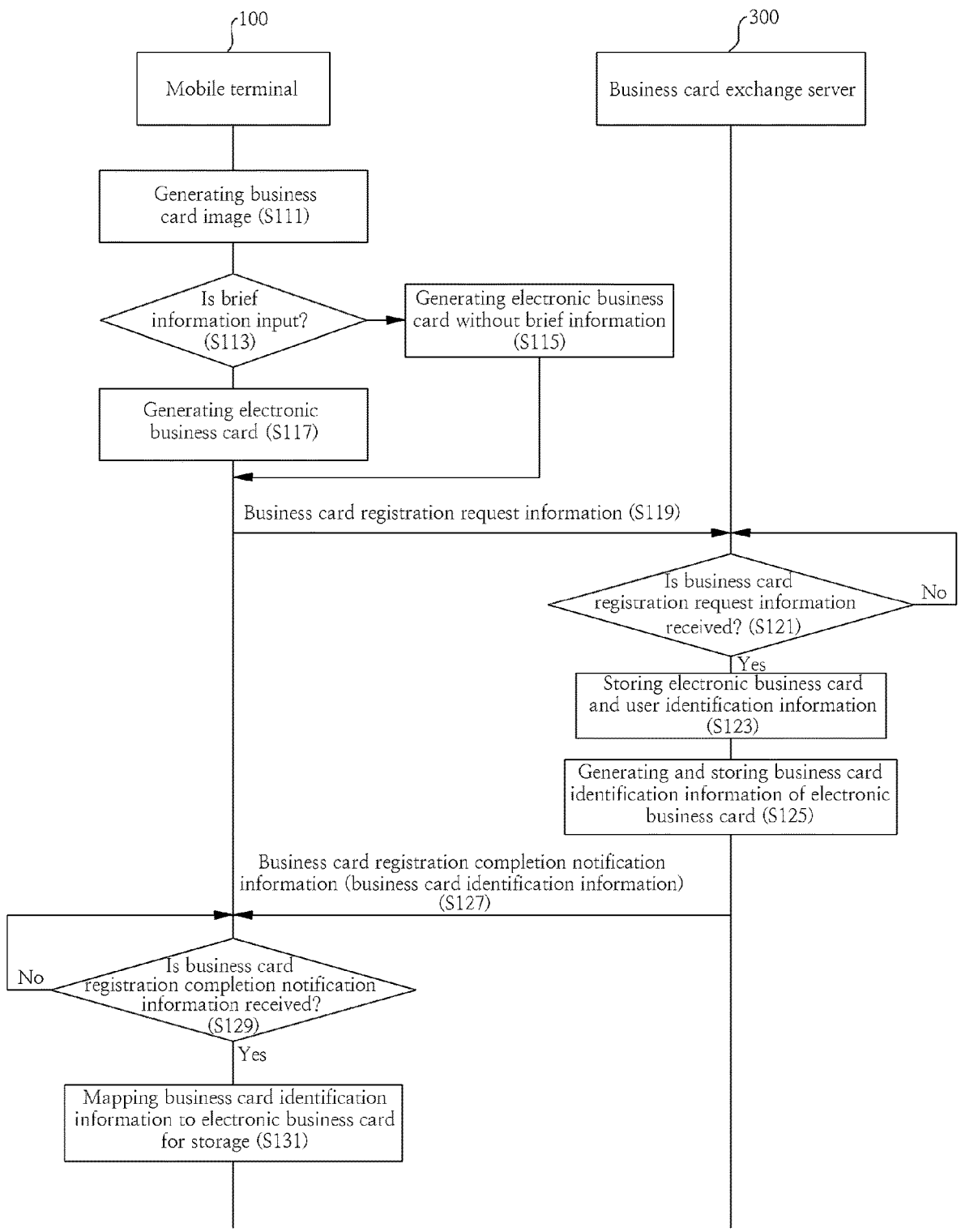
FIG. 5 is a flowchart illustrating an electronic business card registration process of an electronic business card exchange method using a mobile terminal according to the present invention.

FIG. 5 is a flowchart illustrating an electronic business card registration process of an electronic business card exchange method using a mobile terminal according to the present invention.

Referring to FIG. 5, the user who wants to register an electronic business card needs to acquire a business card image thereof using his/her mobile terminal 100 at step S111.

The mobile terminal 100 may generate the business card image through a separate business card generation application. Alternatively, the mobile terminal 100 may use the camera unit 140 of the mobile terminal 100 to photograph a real business card so as to generate the business card image.

When the business card image is acquired, the mobile terminal 100 determines whether the brief information of the acquired business card image is input, at step S113. When the brief information is not input, the electronic business card without brief information is generated at step S115. When the brief information is input, the electronic business card with the brief information is generated at step S117.

When the electronic business card is generated, the business card registration request information including the electronic business card and the user identification information is transmitted to the business card exchange server 300 at step S119.

The business card exchange server 300 continuously monitors whether the business card registration request information is received at step S121. When the business card registration request information is received, the electronic business card and the user identification information included in the business card registration request information are extracted and stored in the server business card DB 311 at step S123.

When the electronic business card and the user identification information are stored, the business card exchange server 300 generates the business card identification information of the electronic business card and maps the generated business card identification information to any one or more among the electronic business card and the user identification information for storage at step S125.

After the business card identification information is generated and stored, the business card exchange server 300 transmits business card registration completion notification information including the business card identification information to the mobile terminal 100 at step S127.

After transmitting the business card registration request information, the mobile terminal 100 monitors whether the business card registration completion notification information is received at step S129. When the business card registration completion notification information is received, the mobile terminal 100 detects the business card identification information included in the business card registration completion notification information and maps the business card identification information to the user's electronic business card in the business card DB 111 for storage at step S131.

Figure 6:
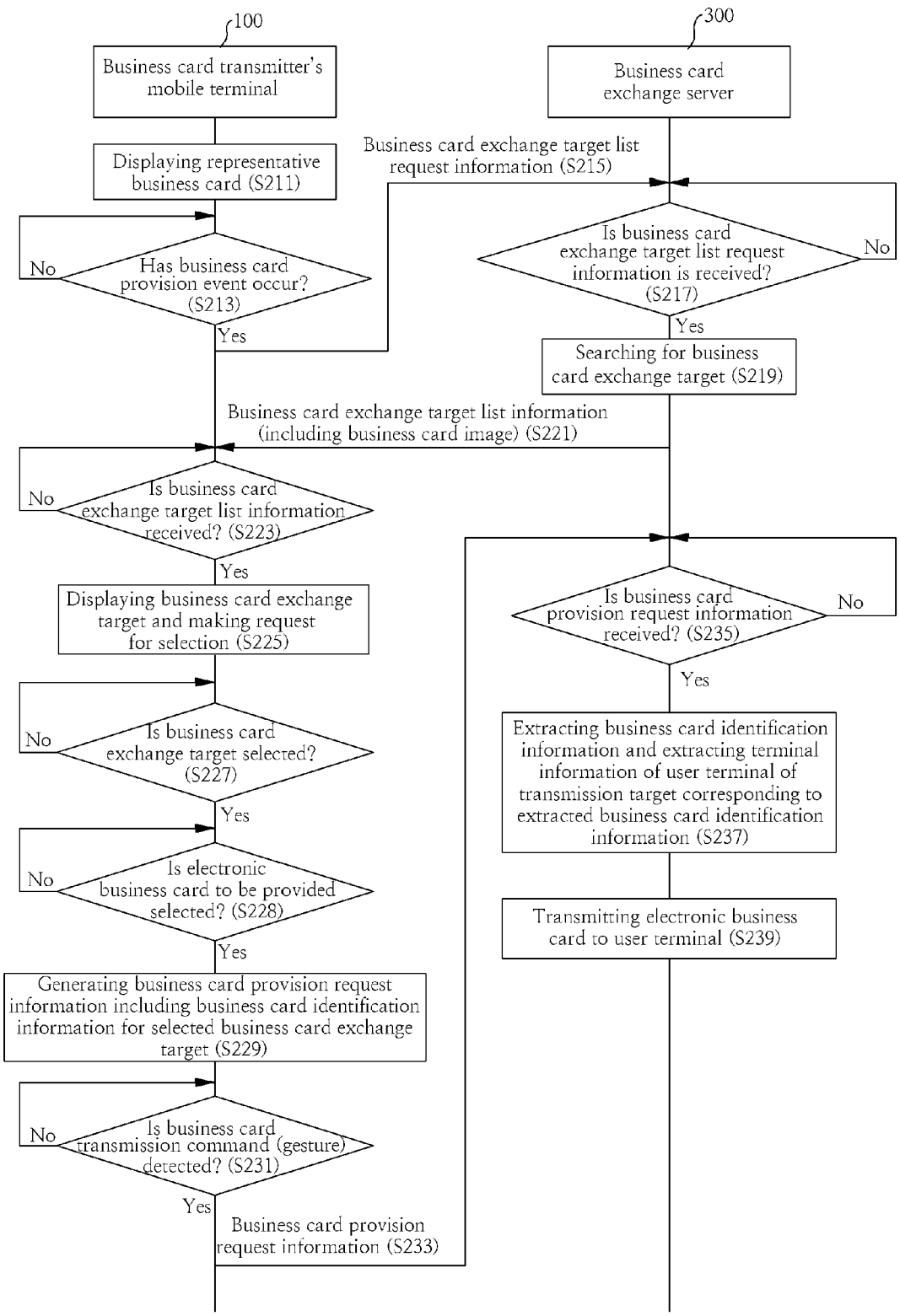
FIG. 6 is a flowchart illustrating an electronic business card transmission process of an electronic business card exchange method using a mobile terminal according to the present invention.
Figure 7A:
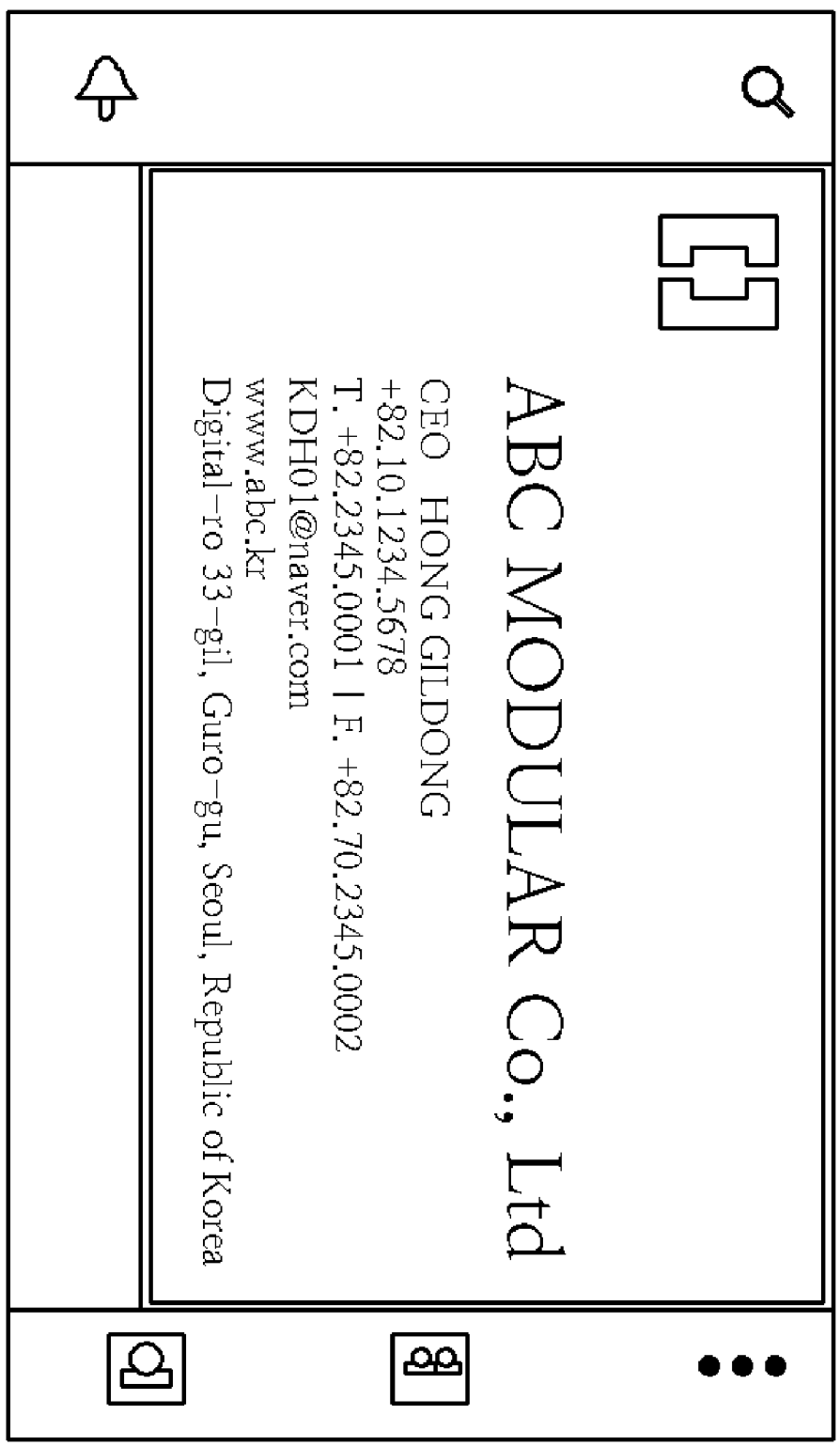
FIGS. 7A and 7B are diagrams illustrating an electronic business card transmission screen in a mobile terminal according to a first embodiment of the present invention.
Figure 7B:
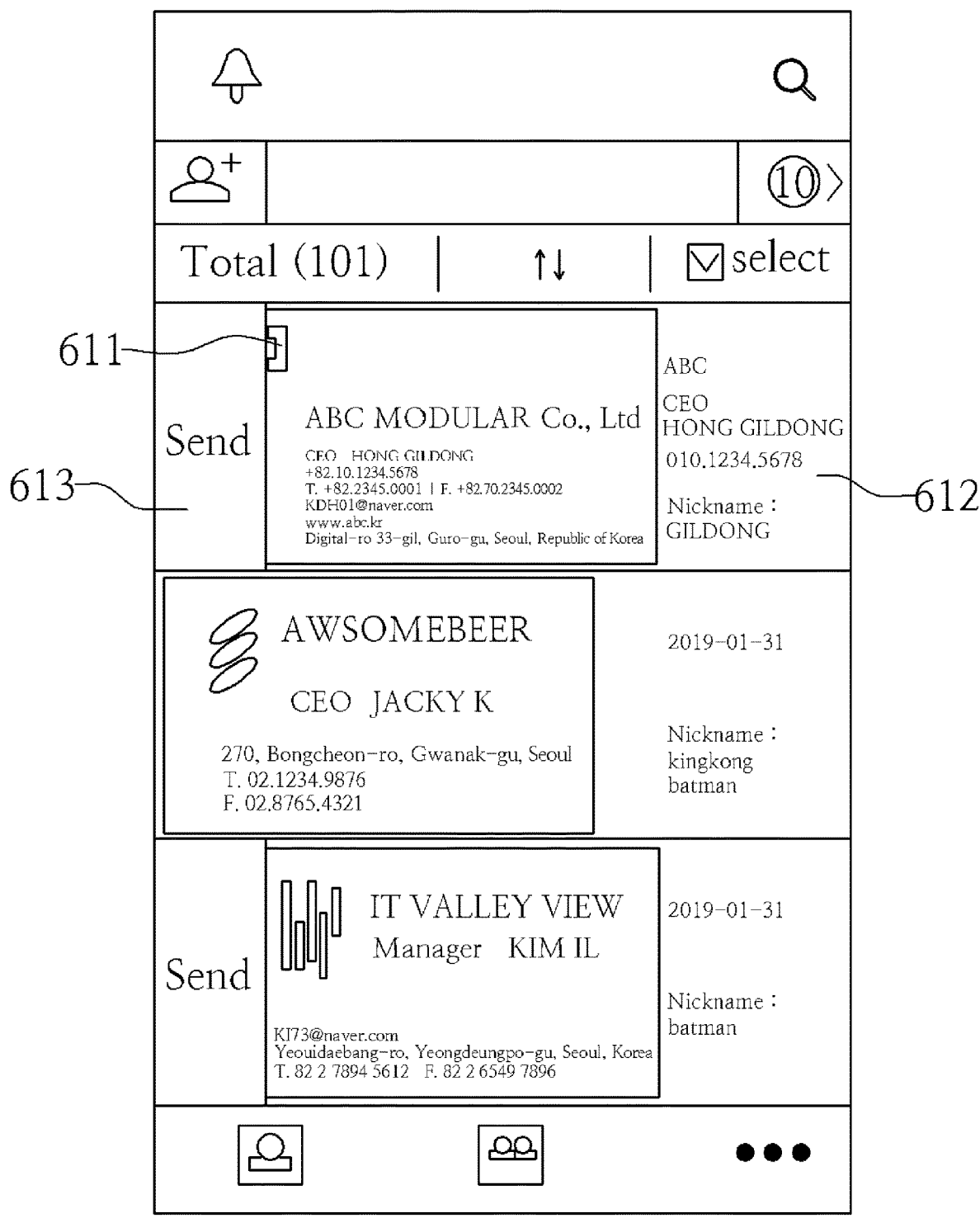
Figure 8A:
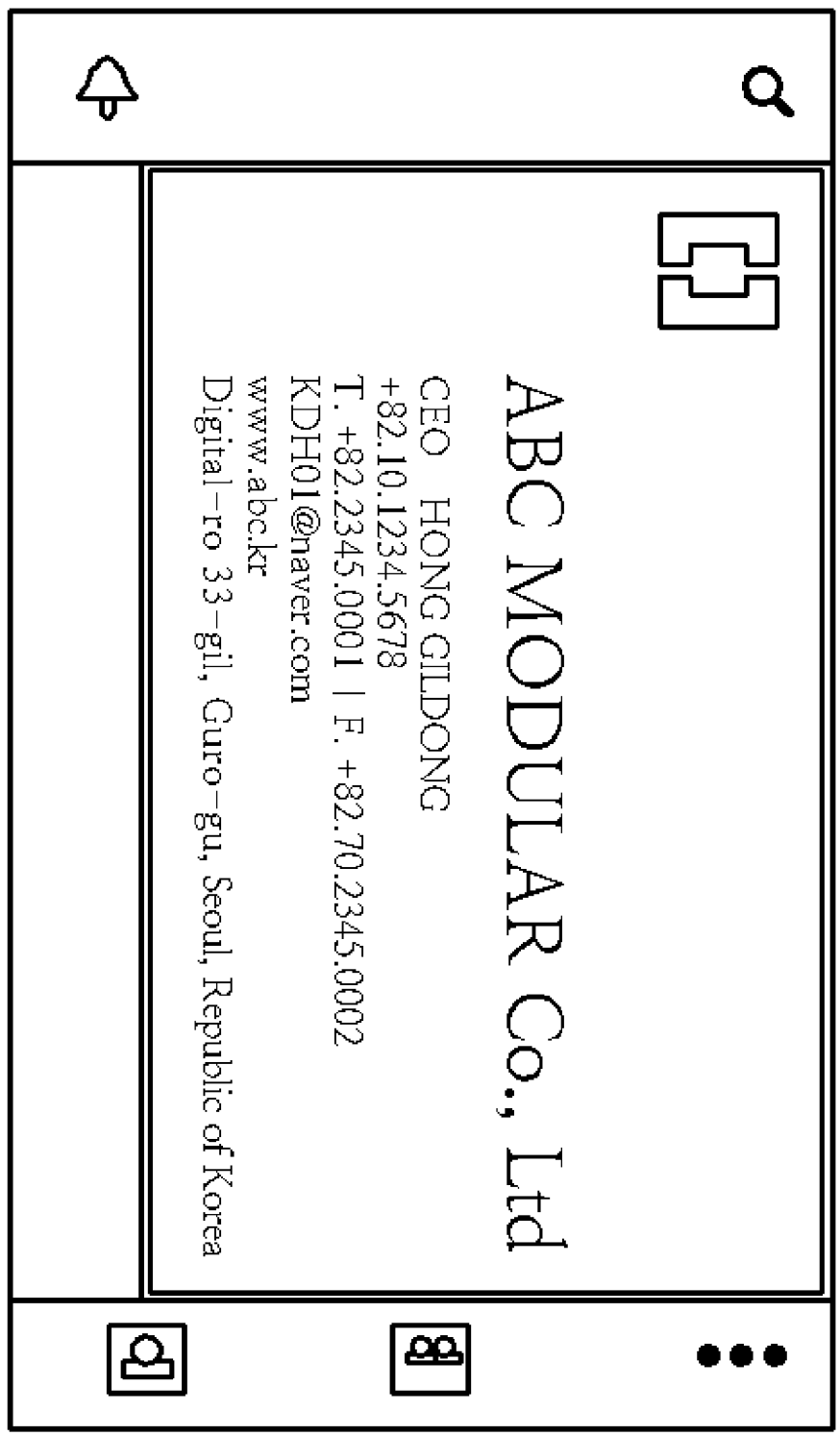
FIGS. 8A to 8F are diagrams illustrating an electronic business card transmission screen in a mobile terminal according to a second embodiment of the present invention.

FIG. 6 is a flowchart illustrating an electronic business card transmission process of an electronic business card exchange method using a mobile terminal according to the present invention. FIGS. 7A and 7B are diagrams illustrating an electronic business card transmission screen in a mobile terminal according to a first embodiment of the present invention. FIGS. 8A to 8F are diagrams illustrating an electronic business card transmission screen in a mobile terminal according to a second embodiment of the present invention. Hereinafter, the description will be made with reference to FIGS. 6 to 8F The mobile terminal 100 usually operates in the electronic business card reception mode. Until a business card provision (offer) event occurs, the mobile terminal 100 displays a representative (electronic) business card, which is its electronic business card, at step S211, as shown in FIGS. 7A and 8A.

With the representative (electronic) business card displayed, the mobile terminal 100 monitors whether the business card provision (offer) event occurs at step S213.

When the business card provision event occurs, the mobile terminal 100 is set to be in the electronic business card provision mode and transmits, to the business card exchange server 300, the business card exchange target list request information that includes only the user identification information or includes the user identification information and any one or more among the keyword (search word) and the position information, at step S215.

While the business card exchange server 300 monitors whether the business card transmission target list request information is received at step S217, when the business card exchange target list request information is received, the business card exchange server 300 searches for the business card exchange target on the basis of the business card exchange target list request information at step S219 and transmits the business card exchange target list including the found business card exchange target to the mobile terminal 100 at step S221. Herein, the business card exchange target list may include the electronic business cards that the users who are the included business card exchange target register, respectively, only the business card images of the respective electronic business cards that the users who are the business card exchange targets registers, or only the thumbnail images for the business card images.

The mobile terminal 100 operating in the electronic business card provision mode monitors whether business card exchange target list information is received after the business card exchange target list request information is transmitted, at step S223. When the business card exchange target list information is received during the monitoring, the business card exchange target is displayed on the display unit 120 as shown in FIG. 7B and a request is made to select at least one of the business card exchange targets at step S225. The business card exchange target list and the received electronic business card may be configured in such a manner as to vertically display multiple electronic business cards on one screen, may be configured to scroll up and down according to the number thereof, and may be configured to be displayed in the form of a thumbnail in the top portion as shown in FIGS. 8B and 8C.

Figure 8B:
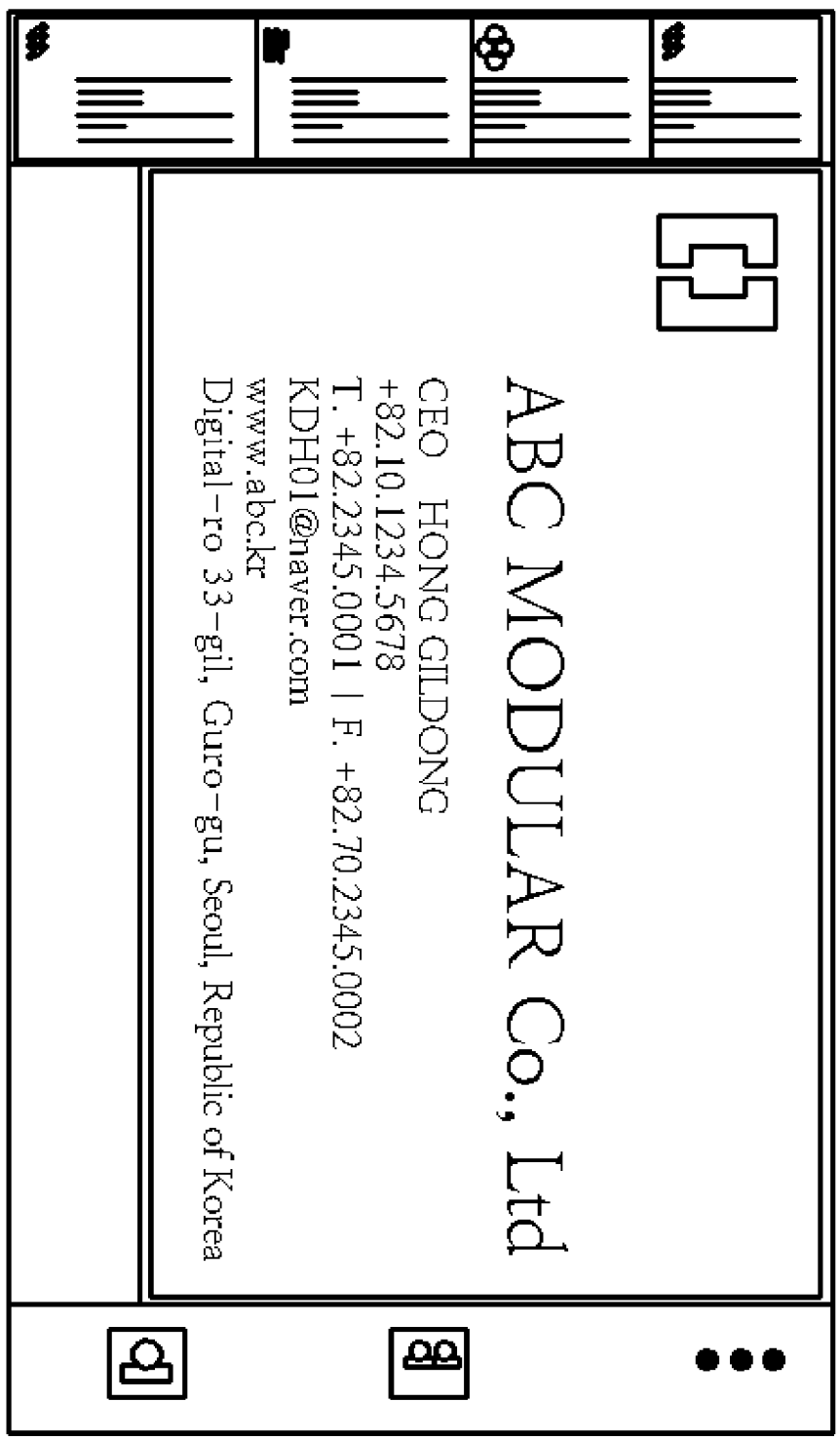
Figure 8C:
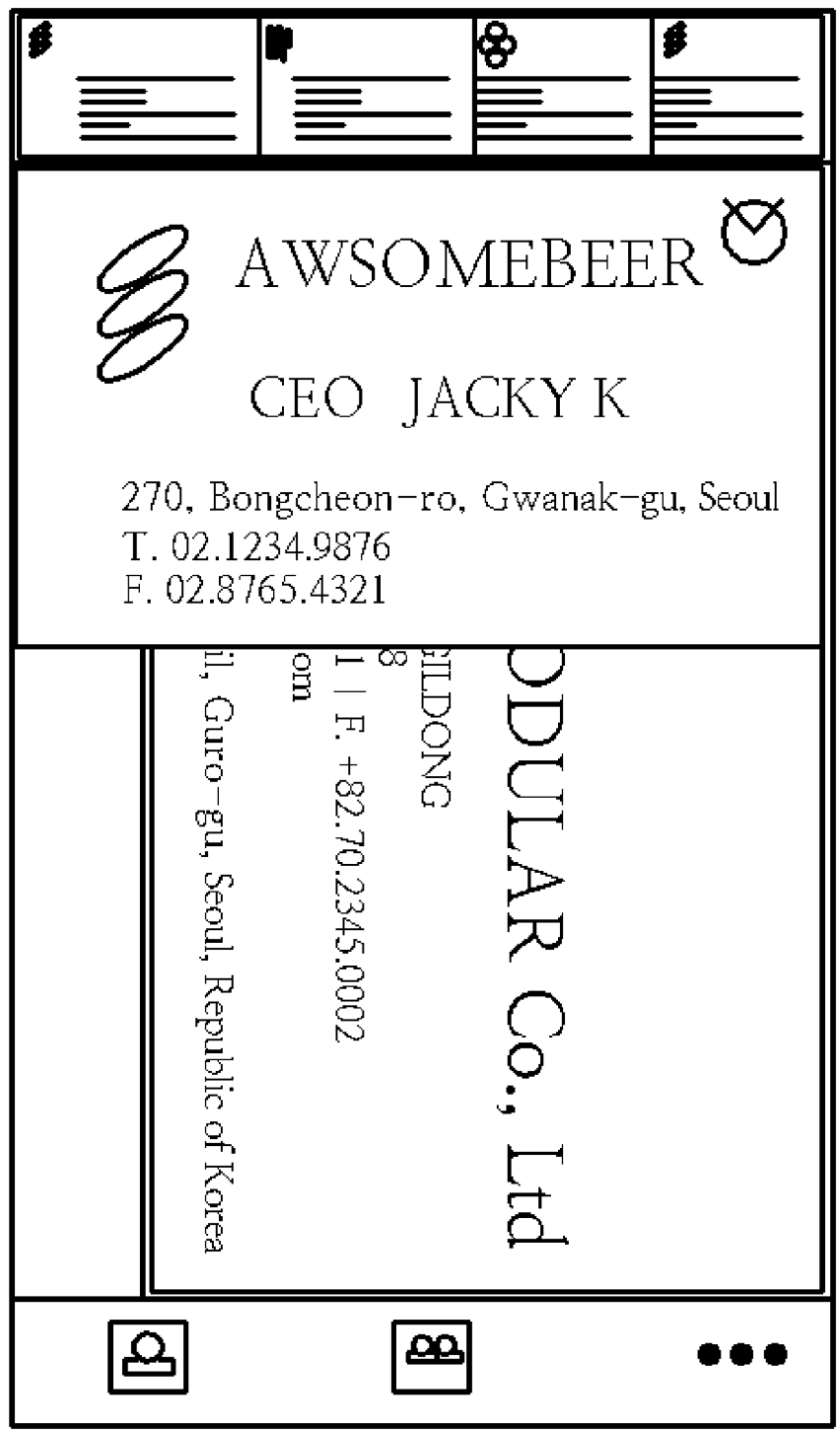

In the case of FIG. 8B, the thumbnail images are preferably configured to scroll left and right according to the number of the business card exchange targets. When the electronic business cards of the business card exchange targets are displayed in a format of a vertical list, the electronic business cards are preferably configured to scroll up and down according to the number of the business card exchange targets.

After the request for displaying and selecting the business card exchange target, the mobile terminal 100 monitors whether at least one business card exchange target is selected at step S227. When the business card exchange target is selected, the mobile terminal 100 enlarges and displays the business card image, which is the business card exchange target identification information of the selected business card exchange target, as shown in FIG. 8C and checks a check box to indicate that the selected business card exchange target is selected. The user may select the thumbnail image of the business card transmission target in FIG. 8B and may touch, while the large business card image is displayed, the business card image for a predetermined time or more, thereby selecting the business card transmission target.

When the business card exchange target is selected, the mobile terminal 100 displays the representative business card, which is the user's electronic business card, at the topmost as shown in FIG. 7B, arranges the received electronic business cards in order below the representative business card according to a predetermined rule, makes a request to select the electronic business card to be provided, and monitors whether the electronic business card to be provided is selected at step S228. Although FIG. 6 shows the case where the electronic business card to be provided is selected, the electronic business card to be provided may not be selected and only the representative business card may be transmitted. Herein, as shown in FIG. 7B, the electronic business card may include a business card image 611 and brief information 612.

One or more electronic business cards to be provided may be selected. A business card image 611 of the selected electronic business card may be configured in such a manner that the electronic business card to be transmitted is slightly moved to the right as shown in FIG. 7B, the multiple electronic business cards are selected, and a transmission button 613 represented on each of the selected electronic business cards is clicked so that transmission takes place electronic business card by electronic business card. Alternatively, the business card image 611 of the selected electronic business card may be configured to transmit the selected electronic business cards by clicking one transmission button.

Figure 8D:
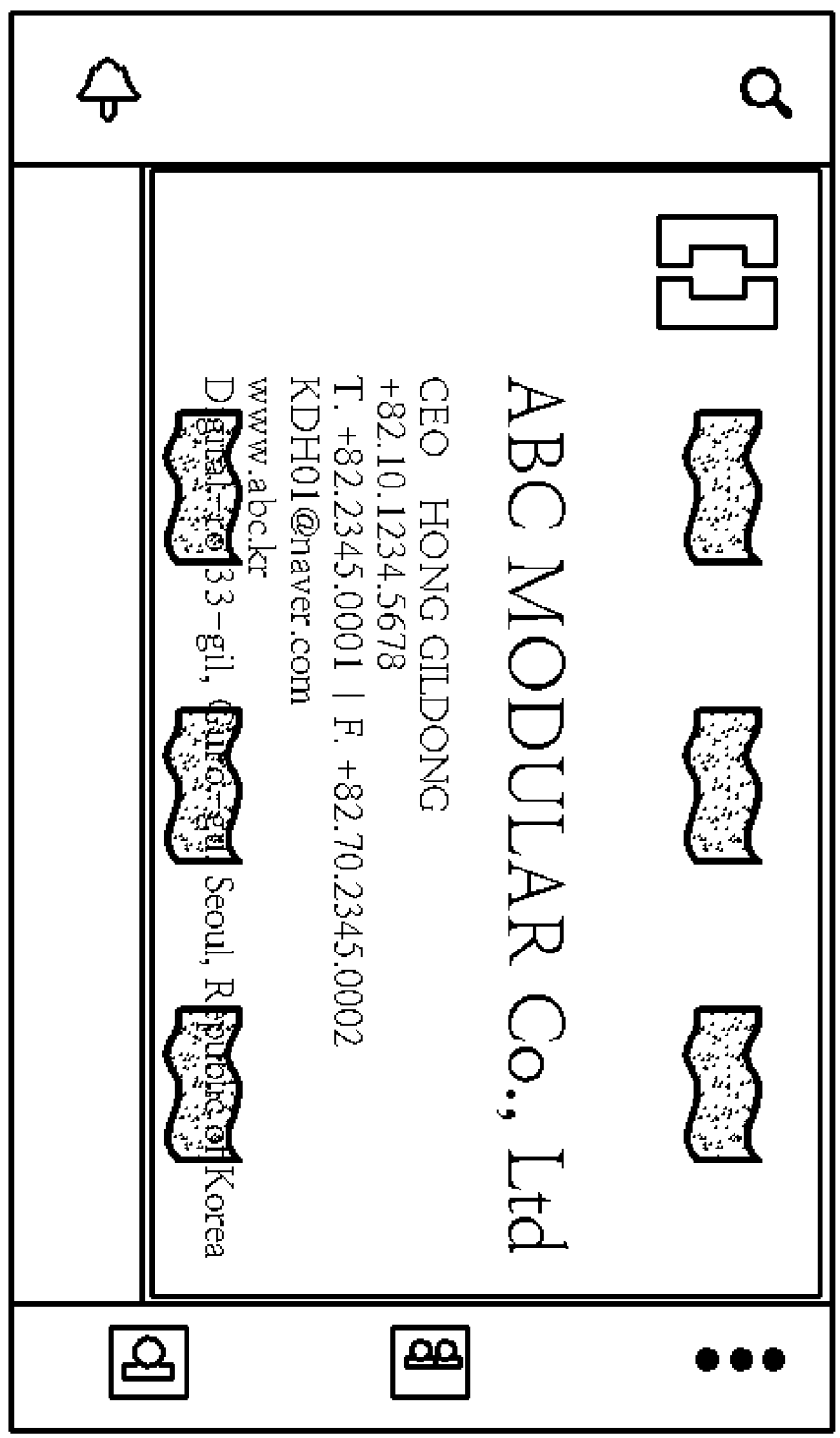

When the electronic business card to be provided is selected, the mobile terminal 100 generates the business card provision request information including the business card identification information of the selected electronic business card for buffering at step S229 and then determines whether a business card transmission gesture (command) is detected at step S231. Herein, when the electronic business card is selected, a wave effect is provided to the electronic business card to be transmitted as shown in FIG. 8D in order to inform the user that the electronic business card to be provided is ready to be transmitted.

Figure 8E:
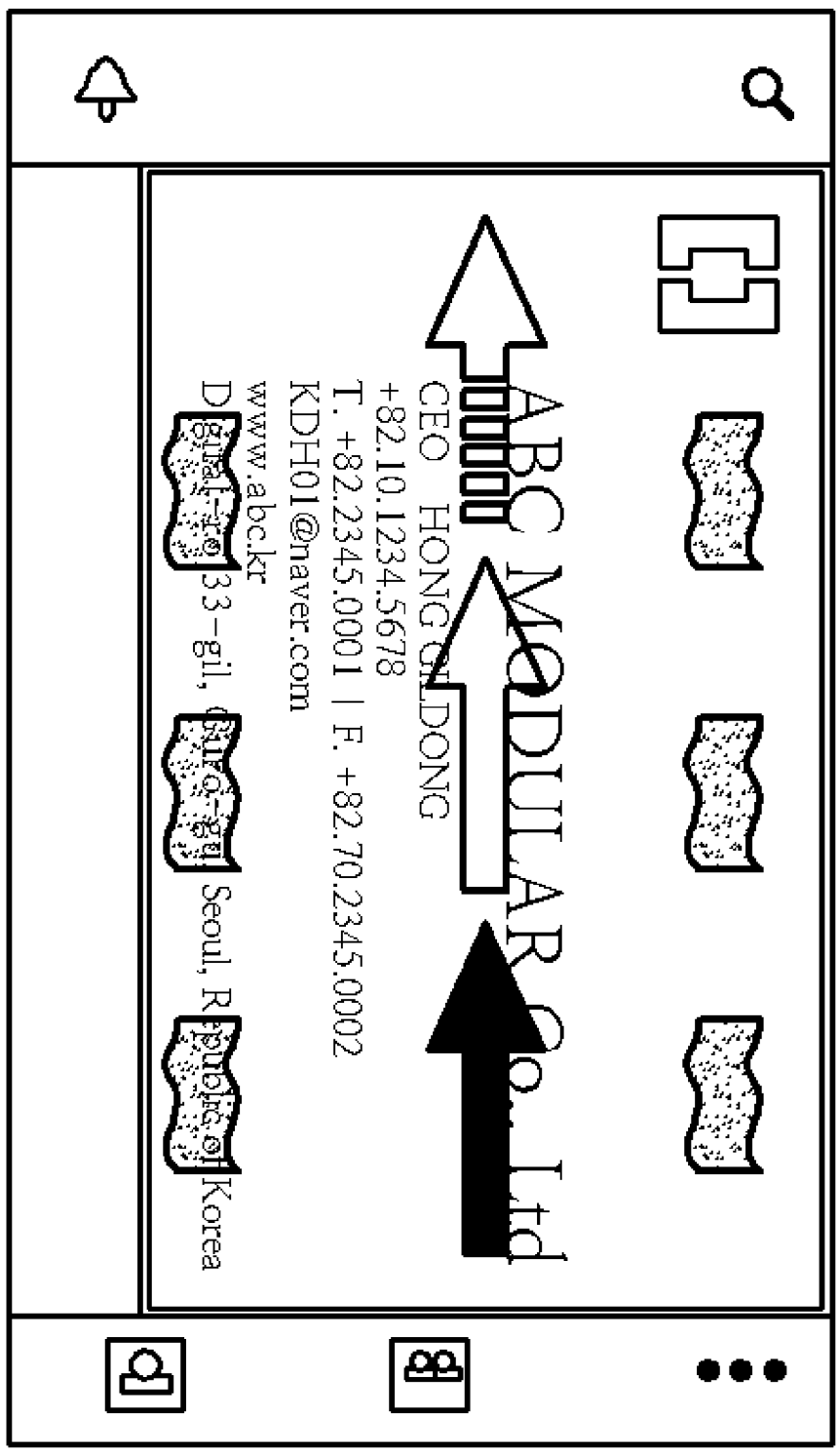
Figure 8F:
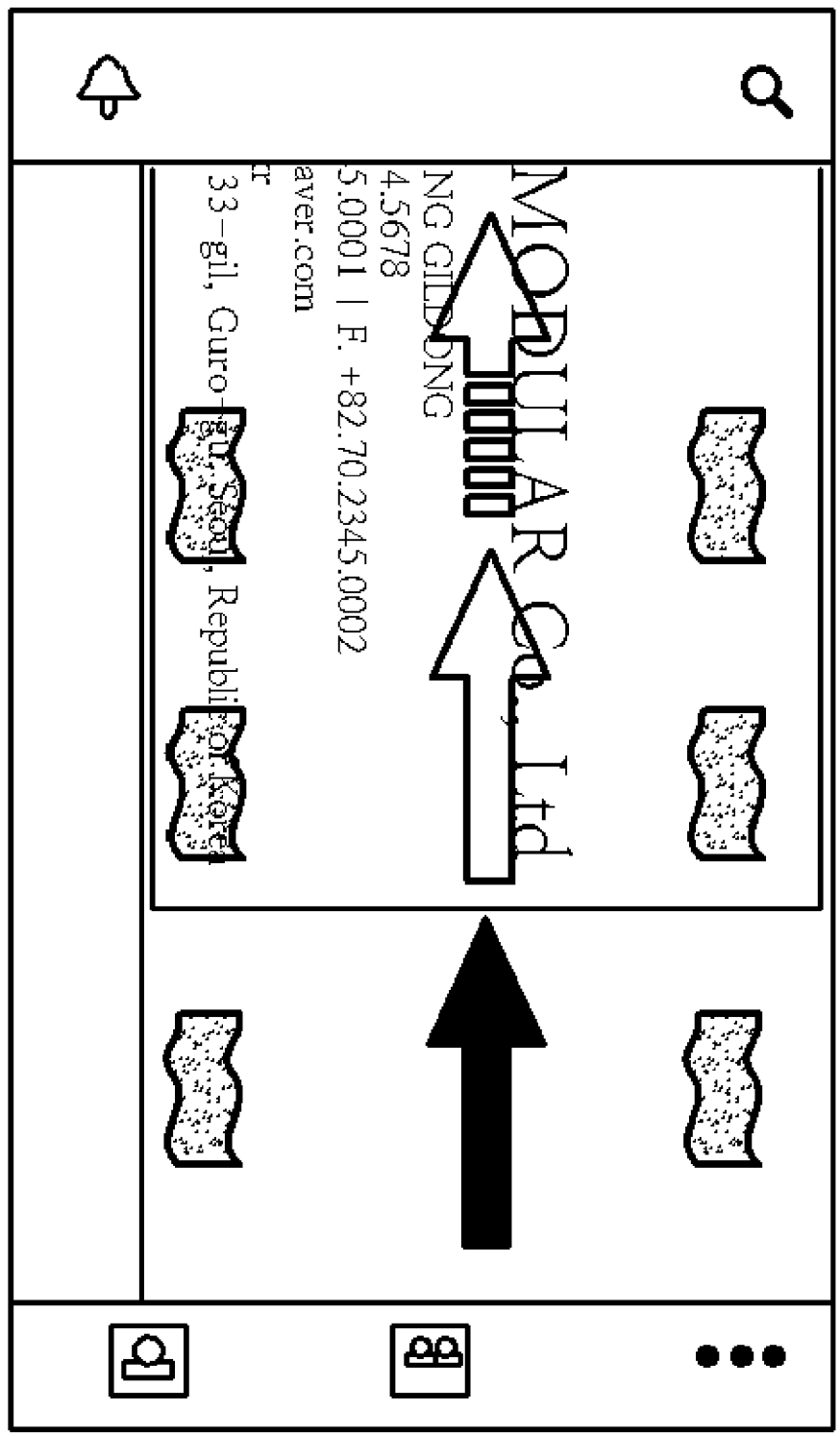

When the business card transmission gesture is detected, the mobile terminal 100 transmits the business card provision request information including the business card identification information of at least one electronic business card to the business card exchange server 300 at step S233. Further, herein, the mobile terminal 100 provides a transmission effect such as the business cards to be transmitted are sequentially moved upwards as shown in FIGS. 8E and 8F.

After transmitting the business card exchange target list information, the business card exchange server 300 monitors whether the business card provision request information is received at step S235. When the business card provision request information is received, the business card exchange server 300 extracts the business card identification information included in the business card provision request information, loads the electronic business card corresponding to the business card identification information from the server business card DB 311, and extracts terminal information, which is included in the user identification information of the business card exchange target corresponding to the business card identification information, of the mobile terminal at step S237.

When the terminal information of the mobile terminal is extracted and the electronic business card is loaded, the business card exchange server 300 transmits the loaded electronic business card to the mobile terminal 100 indicated by the terminal information, at step S239.

Figure 9:
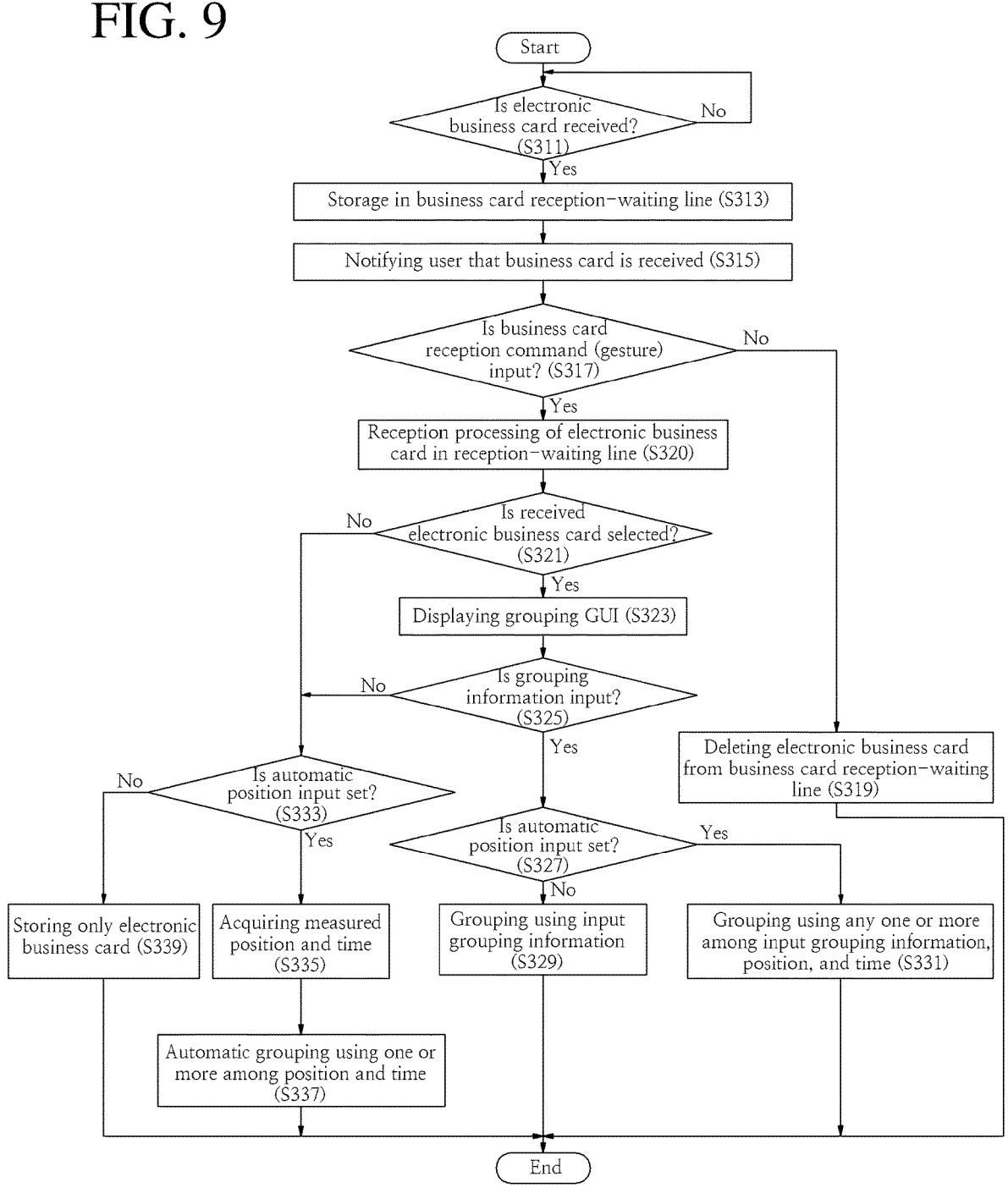
FIG. 9 is a flowchart illustrating an electronic business card receiving and grouping process of an electronic business card exchange method using a mobile terminal according to the present invention.
Figure 10A:
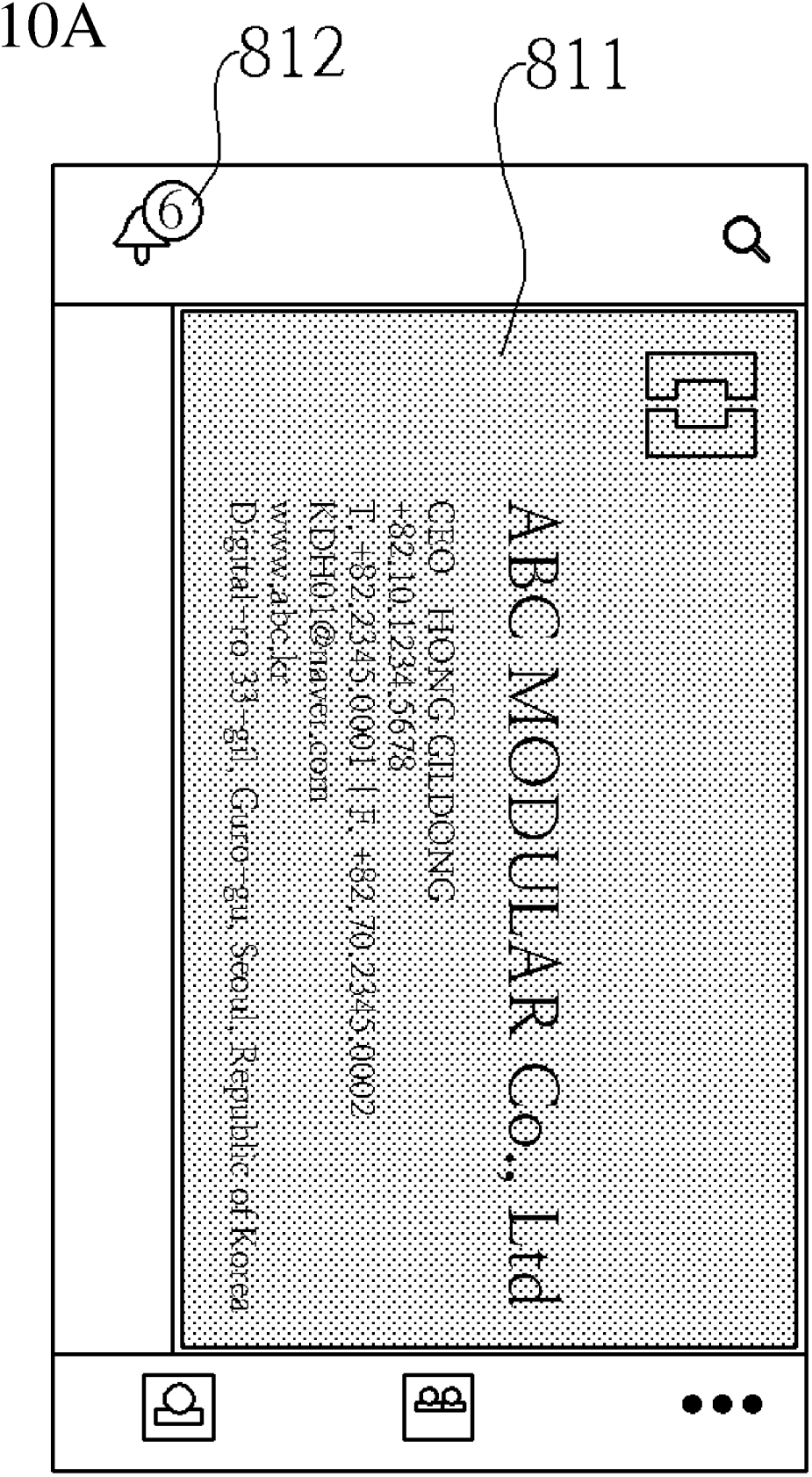
FIGS. 10A to 10C are diagrams illustrating an electronic business card reception screen in a mobile terminal according to an embodiment of the present invention.
Figure 10B:
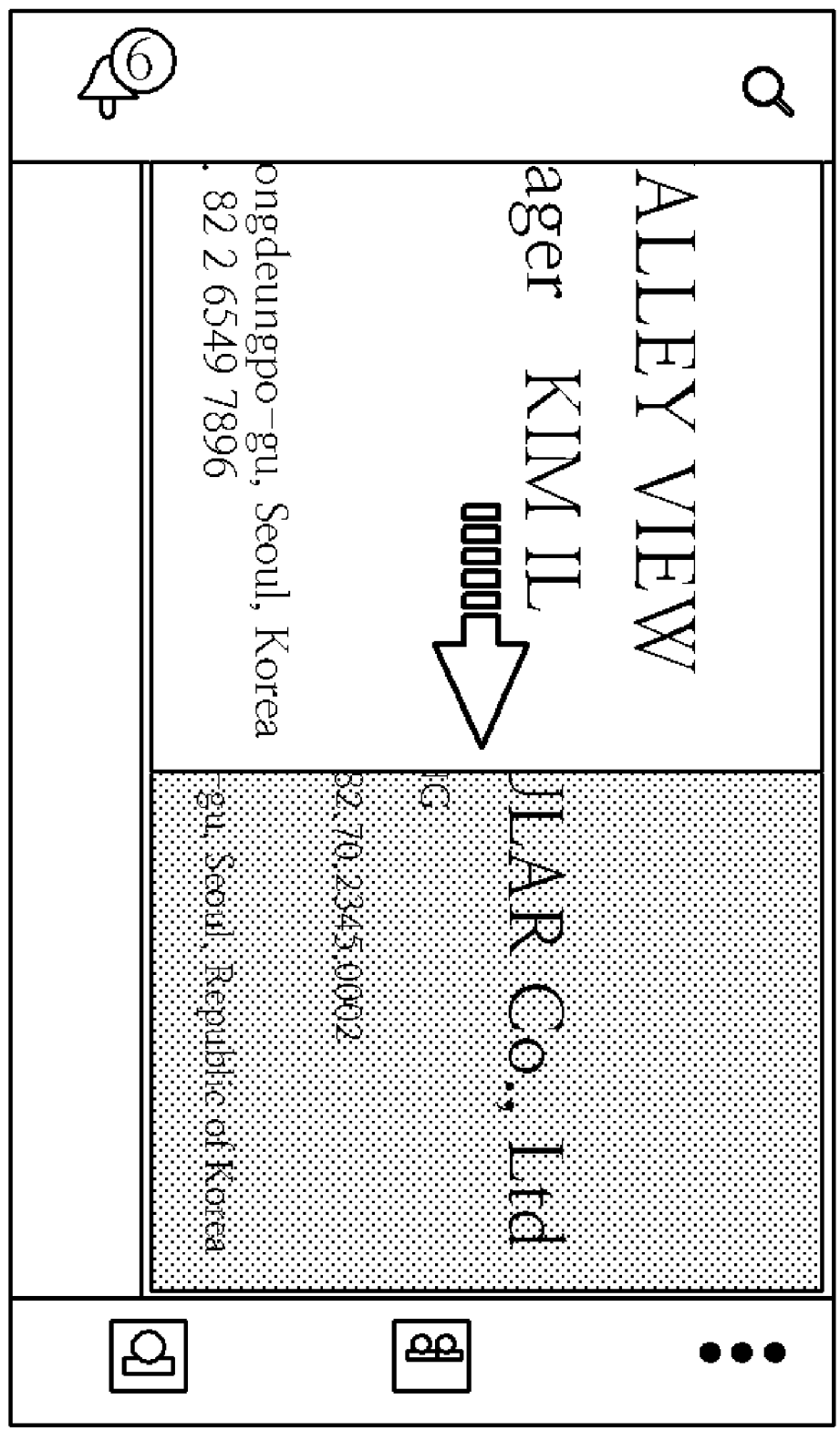
Figure 10C:
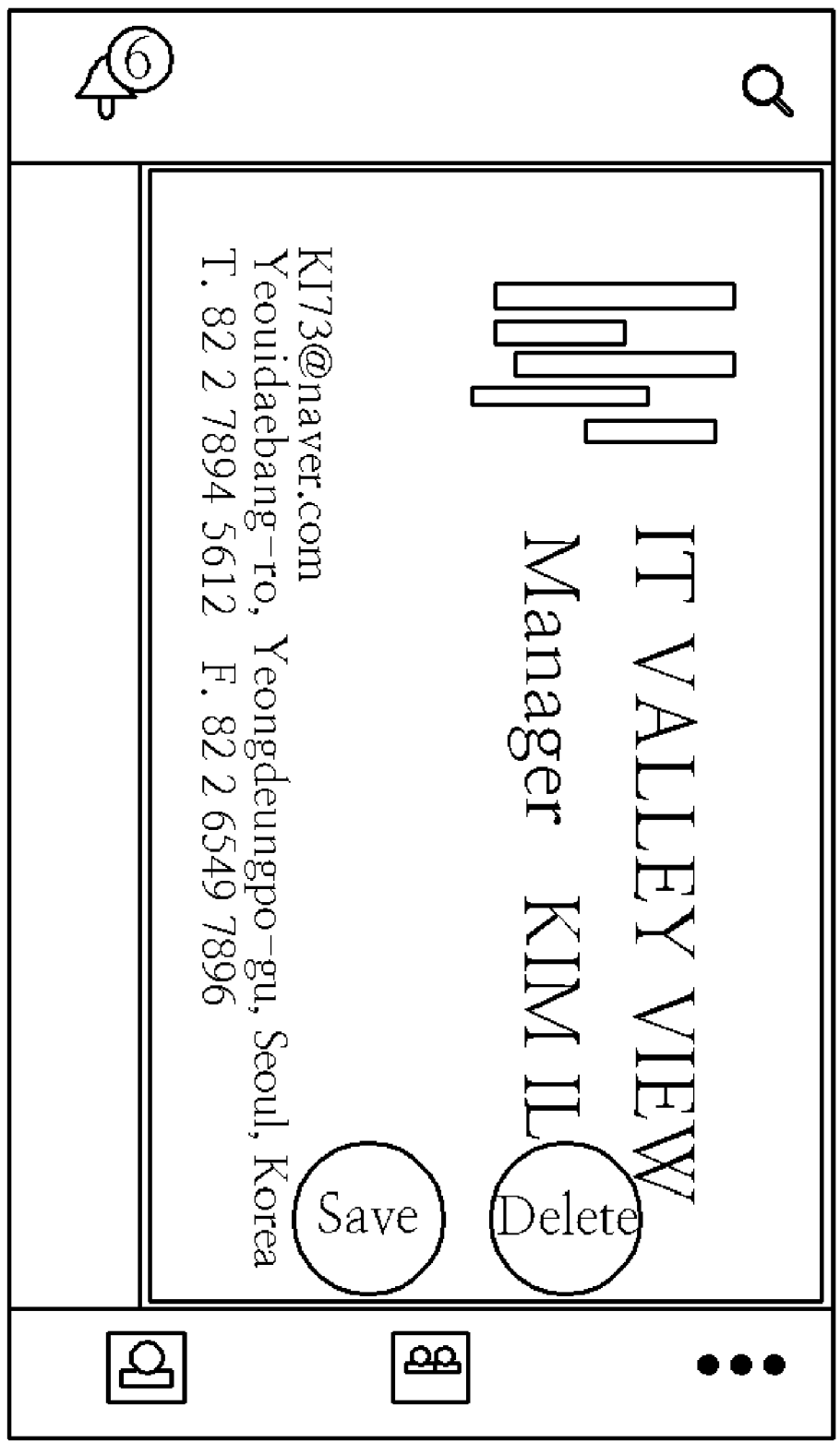
Figure 11A:
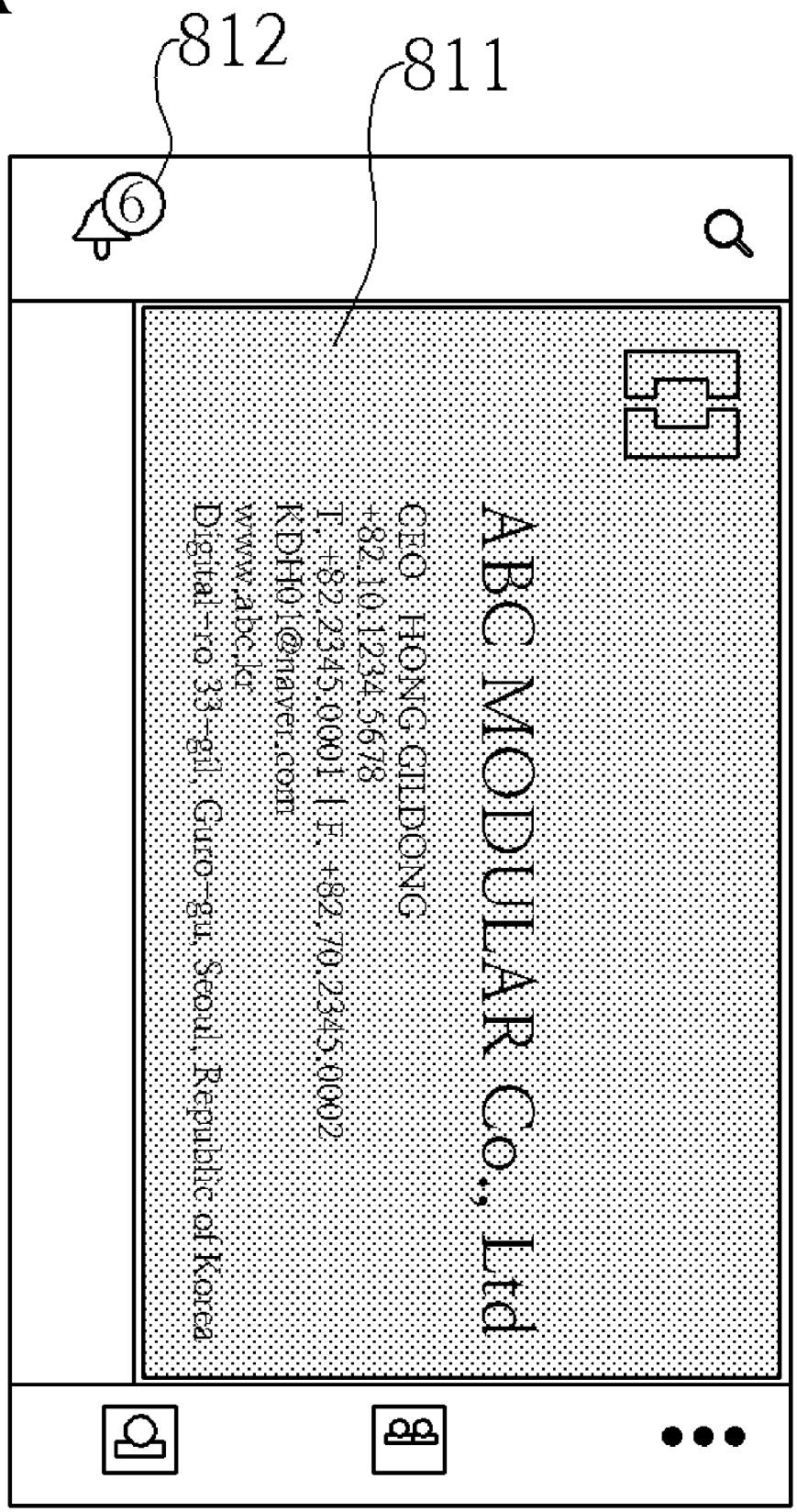
FIGS. 11A to 11C are diagrams illustrating an electronic business card receiving and grouping screen in a mobile terminal according to an embodiment of the present invention.
Figure 11B:
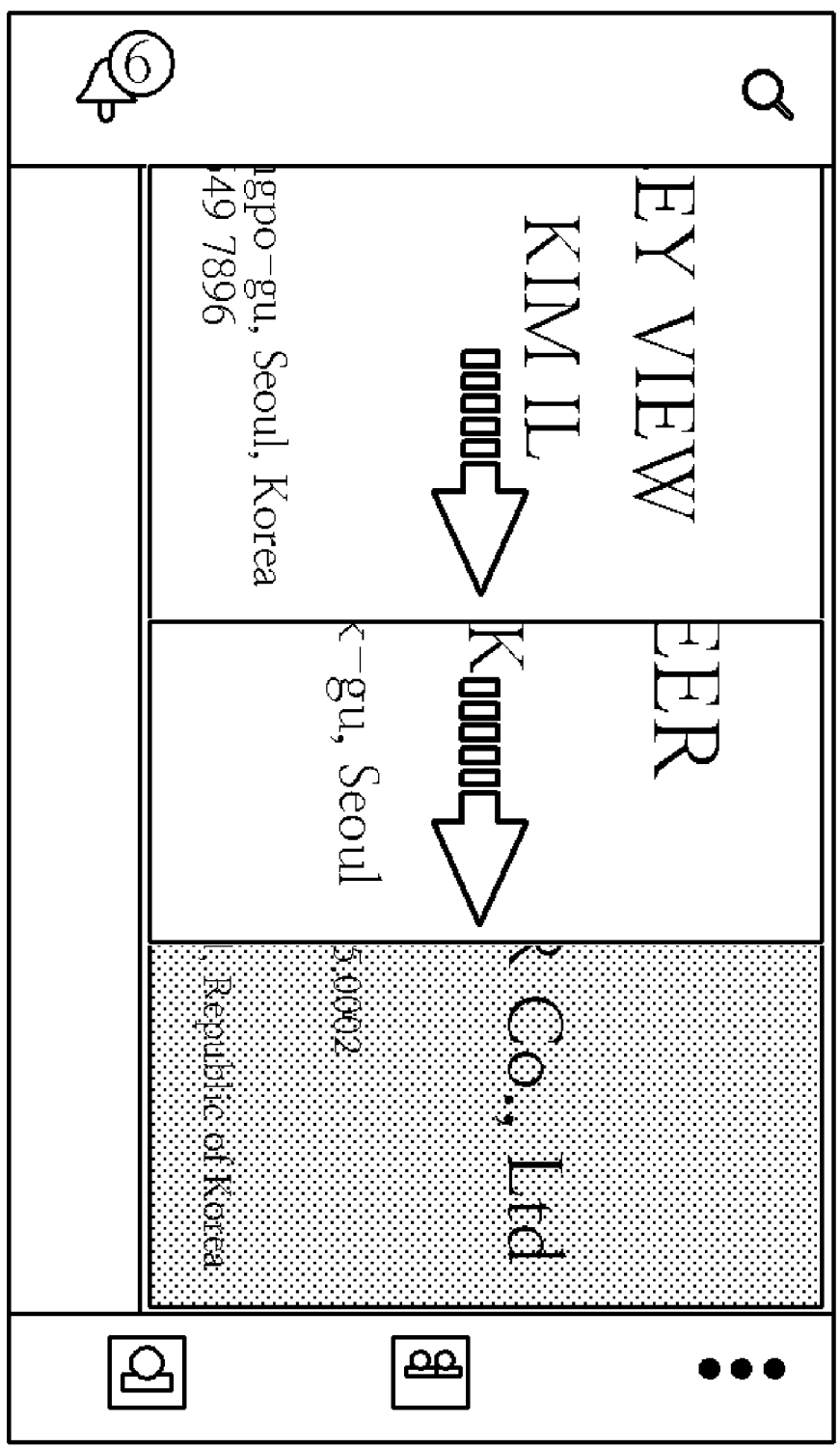
Figure 11C:
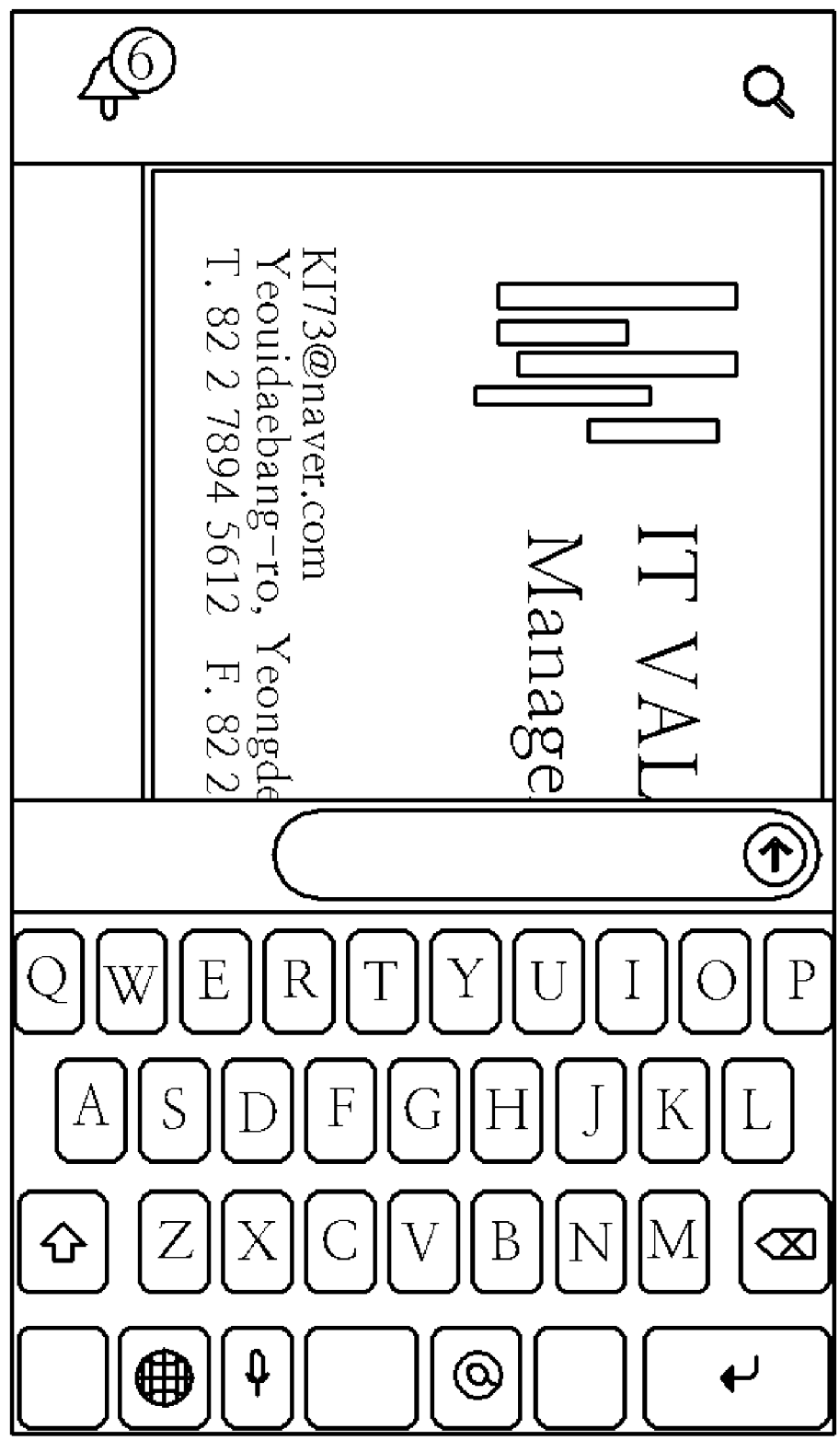

FIG. 9 is a flowchart illustrating an electronic business card receiving and grouping process of an electronic business card exchange method using a mobile terminal according to the present invention. FIGS. 10A to 10C are diagrams illustrating an electronic business card reception screen in a mobile terminal according to an embodiment of the present invention. FIGS. 11A to 11C are diagrams illustrating an electronic business card receiving and grouping screen in a mobile terminal according to an embodiment of the present invention. Hereinafter, the description will be made with reference to FIGS. 9 to 11C.

First, the mobile terminal 100 operating in the electronic business card reception mode monitors whether the electronic business card is received from the business card exchange server 300 at step S311.

When the electronic business card is received, the mobile terminal 100 stores at least one received electronic business card in a business card reception-waiting line of the reception-waiting DB 113 at step S313.

When the received electronic business card is stored in the reception-waiting line, the mobile terminal 100 provides visual and auditory effects through the display unit 120 and the audio processing unit 160 as shown in FIGS. 10A and 11A to notify the user that the electronic business card waiting to be received is present, at step S315. As a notification method of a method waiting to be received, a main screen 811 is processed to be dark as shown in FIGS. 10A and 11A, or the number of the electronic business cards waiting to be received is represented by a notification bell icon 812 as shown in FIGS. 8A, and 10A to 10C.

After the reception-waiting of the electronic business card, the mobile terminal 100 determines whether the business card reception gesture (command) is input at step S317. The gesture may be an action of clicking the notification bell icon 812 shown in FIGS. 10A and 11C or may be an action of shaking the mobile terminal 100. Further, the business card reception gesture causes a save button, which is for receiving and storing the business card, and a delete button, which is for deleting the selected electronic business card, to be represented on the selected electronic business card as shown in FIG. 10C. When the delete button is clicked, the electronic business card is deleted. When the save button is clicked, the electronic business card is processed for reception and stored.

When the business card reception gesture is not input for a predetermined time, the electronic business card is deleted from the business card reception-waiting line at step S319. The predetermined time may be several minutes, hours, days, months, or years, depending on the user's setting.

When the business card reception gesture is received, the mobile terminal 100 receives at least one electronic business card waiting to be received and stores the same in the business card DB 111 at step S320. Herein, as shown in FIGS. 8B and 10B, the mobile terminal 100 continuously displays multiple electronic business cards with the effect such as the electronic business cards are received as they move from top to bottom. The previously received electronic business cards may be displayed to be dark. Further, the mobile terminal 100 may be configured to display a process of receiving the electronic business card as shown in FIGS. 10B and 11B and simultaneously output a sound effect, for example, "sss~", or the like, of receiving the electronic business card through the speaker of the audio processing unit 160.

When the electronic business card is processed for reception, the mobile terminal 100 determines whether the received electronic business card is selected at step S321.

When the electronic business card is selected, the mobile terminal 100 displays a grouping GUI on the display unit 120 as shown in FIG. 11C to request inputting of the grouping information for the selected electronic business card at step S323 and monitors whether the grouping information is input at step S325.

When the grouping information is input, the mobile terminal 100 determines whether automatic position input is set at step S327. When the automatic input is not set, a group based on the input grouping information is generated or the electronic business card is included in the existing group at step S329.

Conversely, when the automatic position input is not set, the mobile terminal 100 sets the input grouping information, and measured position information and time information as the grouping information, and generates a group of the set grouping information to include the electronic business card in the group or includes the electronic business card in the existing group at step S331.

Further, when the received electronic business card is not selected at step S321 or when the grouping information is not input, the mobile terminal 100 determines whether the automatic position input is set at step S333. When the automatic position input is set, measured position and time are acquired at step S335. Then, a group corresponding to the acquired position and time is generated and the electronic business card is included in the group, or the electronic business card is included in the corresponding existing group, thereby performing automatic grouping at step S337.

However, when the automatic position input is not set, the mobile terminal 100 stores only the electronic business card in the business card DB 111 at step S339.

In the meantime, the present invention is not limited to the above-described exemplary embodiments, and it will be understood by those skilled in the art that various improvement, modifications, substitutions, and additions may be made without departing from the scope of the present invention. It is noted that if embodiments by such improvements, modifications, substitutions, and additions are within the scope of the following appended claims, the technical ideas thereof are also within the scope of the present invention.

What is claimed is:

1. An electronic business card exchange system using a mobile terminal, the system comprising:
   the mobile terminal configured to
   generate and store an image-based electronic business card and then transmit business card registration request information including the electronic business card and user identification information,
   receive electronic business card identification information corresponding to the electronic business card and map the electronic business card identification information to the electronic business card for storage,
   receive, in an electronic business card provision mode when the electronic business cards are exchanged, selection of at least one business card exchange target and transmit business card provision request information including business card exchange target information of the selected business card exchange target and the electronic business card identification information, and receive, in an electronic business card reception mode, an image-based electronic business card; and a business card exchange server configured to receive the business card registration request information and map and store the electronic business card and the user identification information included therein, generate the electronic business card identification information corresponding to the electronic business card to map the electronic business card identification information to either the electronic business card or the user identification information for storage, and then provide the electronic business card identification information to the mobile terminal, receive the business card provision request information from the mobile terminal operating in the electronic business card provision mode and providing the electronic business card, and transmit the image-based electronic business card corresponding to the business card identification information to the mobile terminal receiving the electronic business card and corresponding to the user identification information, which is included in the business card provision request information, of the at least one business card exchange target.

2. The system of claim 1, wherein the mobile terminal includes:

a wireless communication unit connected to a wired/wireless data communication network in a wireless manner, the wireless communication unit performing data communication with the business card exchange server connected to the wired/wireless data communication network;

a display unit;

an input unit;

a terminal storage unit including a business card DB storing the generated electronic business card of a user of the mobile terminal and the received electronic business card; and a terminal control unit configured to generate the image-based electronic business card, store the generated electronic business card in the business card DB, and transmit the business card registration request information including the electronic business card and the user identification information to the business card exchange server through the wireless communication unit, receive the electronic business card identification information corresponding to the electronic business card from the business card exchange server and map the electronic business card identification information to the electronic business card in the business card DB for storage, receive, in the electronic business card provision mode when the electronic business cards are exchanged, the selection of the at least one business card exchange target and transmit, to the business card exchange server, the business card provision request information including the business card exchange target information of the selected business card exchange target and the electronic business card identification information, and receive, in the electronic business card reception mode, the image-based electronic business card from the business card exchange server and store the received electronic business card in the business card DB.

3. The system of claim 2, wherein the terminal control unit includes:

a business card acquisition unit acquiring the electronic business card including a business card image that is acquired by scanning a real business card;

a business card registration unit configured to acquire the electronic business card and the user identification information that is acquired through the input unit or stored in advance so as to transmit the business card registration request information including the image-based electronic business card and the user identification information to the business card exchange server through the wireless communication unit, and receive the business card identification information in response to the business card registration request information and map the business card identification information to the electronic business card in the business card DB for storage and registration;

an exchange target request unit operating in the electronic business card provision mode, the exchange target request unit transmitting business card exchange target list request information to the business card exchange server and in response to this, receiving a business card exchange target list including the user identification information of the at least one business card exchange target to display the business card exchange target list on the display unit;

an exchange target selection unit receiving, through the input unit, the selection of the at least one of the business card exchange targets in the business card exchange target list displayed on the display unit;

a business card transmission processing unit transmitting, when the at least one business card exchange target is selected, the business card provision request information including the business card exchange target information of the selected business card exchange target and the electronic business card identification information to the business card exchange server; and a business card reception processing unit receiving, in the electronic business card reception mode, the image-based electronic business card from the business card exchange server and storing the electronic business card in the business card DB.

4. The system of claim 3, wherein the mobile terminal further includes a camera unit including a camera to obtain an image formed by a camera lens and outputting the image, which is a still image, and wherein the business card acquisition unit of the terminal control unit acquires the business card image through the camera unit, receives brief information corresponding to the business card of the business card image through the input unit, and generates the electronic business card.

5. The system of claim 3, wherein the mobile terminal further includes a GPS module receiving unique position data from each of multiple GPS satellites and outputting the unique position data, wherein the terminal control unit further includes a position measurement unit calculating a current position by using any one or more among at least three pieces of the position data received through the GPS module and base station signals received from at least three base stations through the wireless communication unit, wherein the exchange target request unit of the terminal control unit transmits the business card exchange target list request information including position information measured by the position measurement unit, and wherein the business card exchange server selects, when the business card exchange target list request information including the position information is received, users within a predetermined distance on the basis of the position information as the business card exchange targets and transmits the business card exchange target list including the selected business card exchange targets to the mobile terminal.

6. The system of claim 3, wherein the business card transmission processing unit includes:
a transmission gesture recognition unit monitoring whether a gesture of the user who is an electronic business card provider is detected when the business card exchange target is selected, and outputting a transmission command when the gesture is detected;
a terminal business card transmission unit transmitting the business card provision request information to the business card exchange server when the transmission command is input from the transmission gesture recognition unit; and
a business card transmission display processing unit performing, when the business card provision request information is transmitted, a display control in such a manner that a transmission action is displayed on the display unit, specifically, the business card image displayed on the display unit gradually disappears while moving forward.

7. The system of claim 6, wherein the mobile terminal further includes a vibration sensor detecting vibration and outputting a vibration intensity signal resulting from the detected vibration, and
wherein the transmission gesture recognition unit recognizes shaking of the mobile terminal as a business card provision gesture by using the vibration intensity signal input through the vibration sensor.

8. The system of claim 6, wherein the mobile terminal further includes an audio processing unit receiving audio data, converting the audio data into an audio signal, and outputting audible sound corresponding to the audio signal through a speaker, and
wherein the business card transmission display processing unit of the terminal control unit performs a control in such a manner that business card transmission audio data is output to the audio processing unit and a sound effect of the business card flying away in the air is output through the audio processing unit.

9. The system of claim 3, wherein the terminal storage unit further includes a reception-waiting DB, and
wherein the business card reception processing unit includes:
a terminal business card reception unit receiving the electronic business card from the business card exchange server and storing the received electronic business card in the reception-waiting DB;
a reception-waiting business card notification unit notifying that the received electronic business card is present, through the display unit when the electronic business card is stored in the reception-waiting DB;
a reception gesture recognition unit configured to
determine, when the electronic business card waiting to be received is present, whether a reception gesture by the user for reception processing of the electronic business card waiting to be received is detected,
receive, the electronic business card stored in the reception-waiting DB when the reception gesture is detected and store the electronic business card in the business card DB, and
delete the electronic business card stored in the reception-waiting DB; and
a business card reception display processing unit performing, when the reception gesture for the electronic business card is detected, a display control in such a manner that the entire electronic business card is displayed as being moved little by little from the beginning of the electronic business card.

10. The system of claim 3, wherein the terminal control unit further includes a meeting information management unit configured to
acquire, when the electronic business card is received, grouping information for the received electronic business card to map the grouping information to the electronic business card for storage,
generate, on the basis of the grouping information, a group of the electronic business cards having a relationship, and
provide, when any electronic business card among the electronic business cards in the group is selected, group information on the group.

11. The system of claim 10, wherein the business card exchange server configured to
receive the business card provision request information including position information and time information from the mobile terminal of an electronic business card provider which operates in the electronic business card provision mode, and
transmit the position information and the time information when the electronic business card is transmitted to the mobile terminal operating in the electronic business card reception mode, and
wherein the meeting information management unit automatically generates, by applying the position information and the time information as the grouping information, a group of the electronic business cards in which a position indicated by the position information is within a predetermined distance and a time indicated by the time information is within a predetermined time.

12. An electronic business card exchange method using a mobile terminal, the method comprising:
an electronic business card registration process in which a business card exchange server configured to
receive business card registration request information and maps an electronic business card and user identification information included in the business card registration request information for storage,
generate electronic business card identification information corresponding to the electronic business card to map the generated electronic business card identification information to either the electronic business card or the user identification information for storage, and
transmit the electronic business card identification information to the mobile terminal that transmits the business card registration request information;
a business card provision request process in which when the electronic business cards are exchanged, the mobile terminal operating in an electronic business card provision mode and providing the electronic business card receives selection of at least one business card exchange target and transmits business card provision request information including business card exchange target information of the selected business card exchange target and the electronic business card identification information to the business card exchange server;

an electronic business card provision process in which the business card exchange server transmits the image-based electronic business card corresponding to the electronic business card identification information included in the business card provision request information to the mobile terminal receiving the electronic business card, the mobile terminal belonging to the business card exchange target indicated by the business card exchange target information included in the business card provision request information; and an electronic business card reception process in which the mobile terminal operating in an electronic business card reception mode and receiving the electronic business card receives the electronic business card that the business card exchange server transmits.

13. The method of claim 12, wherein the electronic business card registration process includes:
   a business card registration request step in which the mobile terminal generates and stores the image-based electronic business card and then transmits the business card registration request information including the electronic business card and the user identification information;
   a business card identification information provision step in which the business card exchange server configured to receive the business card registration request information to map and store the electronic business card and the user identification information included therein, generate the electronic business card identification information corresponding to the electronic business card to map the generated electronic business card identification information to either the electronic business card or the user identification information for storage, and then provide the electronic business card identification information to the mobile terminal; and
   a business card registration step in which a terminal control unit of the mobile terminal receives the business card identification information in response to the business card registration request information and maps the business card identification information to the electronic business card in a business card DB for storage and registration.

14. The method of claim 13, wherein the business card registration request step includes:
   a business card acquisition step in which the terminal control unit of the mobile terminal acquires the electronic business card including a business card image that is acquired by scanning a real business card; and
   an electronic business card request step in which the terminal control unit acquires the electronic business card and the user identification information that is acquired through an input unit or stored in advance so as to transmit the business card registration request information including the image-based electronic business card and the user identification information to the business card exchange server through a wireless communication unit.

15. The method of claim 12, wherein the business card provision request process includes:
   a business card exchange target list request step in which the mobile terminal operating in the electronic business card provision mode transmits business card exchange target list request information to the business card exchange server;
   a business card exchange target list provision step in which when the business card exchange server receives the business card exchange target list request information from the mobile terminal, the business card exchange server transmits a business card exchange target list including the user identification information of the at least one business card exchange target to the mobile terminal; and
   a business card exchange target list reception step in which the mobile terminal receives the business card exchange target list and displays the business card exchange target list on a display unit.

16. The method of claim 15, wherein the business card exchange target list request step includes:
   a position tracking step in which the mobile terminal measures its position on the basis of any one or more among position tracking based on a base station by using a wireless communication unit and position tracking based on a GPS satellite's position by using a GPS module so as to generate position information; and
   a list request step in which the business card exchange target list request information including the position information is generated and transmitted to the business card exchange server,
   wherein the business card exchange target list provision step includes:
   a position information extraction step in which the position information is extracted from the business card exchange target list request information;
   a business card exchange target search step in which the business card exchange target that is within a predetermined distance from a position indicated by the position information is found; and
   a list transmission step in which the business card exchange target list including the found business card exchange target is generated and transmitted to the mobile terminal.

17. The method of claim 12, wherein the business card provision request process includes:
   a business card exchange target selection step in which the at least one business card exchange target is selected among the business card exchange targets in the business card exchange target list that the mobile terminal operating in the electronic business card provision mode and providing the electronic business card receives;
   a transmission gesture recognition step in which the mobile terminal providing the electronic business card monitors whether a business card provision gesture of a user who is an electronic business card provider is detected when the business card exchange target is selected, and outputs a transmission command when the business card provision gesture is detected;
   a business card provision request step in which the mobile terminal providing the electronic business card transmits, when the transmission command occurs, the business card provision request information including the business card exchange target information of the selected business card exchange target and the electronic business card identification information to the business card exchange server; and
   a business card transmission display processing step in which when the mobile terminal providing the electronic business card transmits the business card provision request information, a display control is performed in such a manner that a transmission action is displayed on a display unit, specifically, the business card image displayed on the display unit gradually disappears while moving forward.

18. The method of claim 17, wherein at the transmission gesture recognition step, shaking of the mobile terminal is recognized as the business card provision gesture by a vibration intensity signal input through a vibration sensor.

19. The method of claim 12, further comprising:
a meeting information management process in which when the mobile terminal receiving the electronic business card receives the electronic business card, grouping information for the received electronic business card is acquired and mapped to the electronic business card for storage, a group of the electronic business cards having a relationship is generated on the basis of the grouping information, and when any electronic business card among the electronic business cards in the group is selected, group information on the group is provided.

20. The method of claim 19, wherein the grouping information includes any one or more among a place, a time, and a keyword including a meeting name, and
wherein the mobile terminal receiving the electronic business card includes a function of matching per individual or per group with respect to duplicated electronic business cards for respective groups which are results of grouping by the grouping information so that by using information (image or texture) related to the duplicated electronic business cards for the respective groups, additional matching takes place per individual or per group or personal information capable of being matched is managed.

* * * * *